US010555166B2

(12) United States Patent
Schmidt et al.

(10) Patent No.: US 10,555,166 B2
(45) Date of Patent: Feb. 4, 2020

(54) VEHICLE DETECTION FOR MEDIA CONTENT PLAYER

(71) Applicant: Spotify AB, Stockholm (SE)

(72) Inventors: Fredrik Schmidt, Stockholm (SE); Johan Oskarsson, Stockholm (SE); Shervin Shoravi, Uppsala (SE); Peter Johansson, Stockholm (SE); Ronald Pompa, Stockholm (SE); Lawrence Kennedy, Stockholm (SE); Adam Price, New York, NY (US); Daniel Choe, Brooklyn, NY (US)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/858,776

(22) Filed: Dec. 29, 2017

(65) Prior Publication Data
US 2018/0192285 A1  Jul. 5, 2018

Related U.S. Application Data

(60) Provisional application No. 62/441,263, filed on Dec. 31, 2016.

(51) Int. Cl.
*H04W 4/00* (2018.01)
*H04W 8/22* (2009.01)
*H04W 4/44* (2018.01)

(52) U.S. Cl.
CPC ............... *H04W 8/22* (2013.01); *H04W 4/44* (2018.02)

(58) Field of Classification Search
CPC .................................. H04W 8/22; H04W 4/44
See application file for complete search history.

(56) References Cited

U.S. PATENT DOCUMENTS

| | | | | |
|---|---|---|---|---|
| 2011/0219105 A1* | 9/2011 | Kryze | ..................... | G06F 15/16 709/223 |
| 2011/0285547 A1* | 11/2011 | Crowe | ..................... | C23F 4/00 340/905 |
| 2013/0191397 A1* | 7/2013 | Avadhanam | ........ | G06F 17/3053 707/748 |
| 2013/0275899 A1* | 10/2013 | Schubert | ............... | G06F 3/0481 715/765 |
| 2014/0342718 A1* | 11/2014 | Chen | ..................... | H04W 4/027 455/418 |
| 2015/0317353 A1* | 11/2015 | Zavesky | ........... | G06F 17/30053 707/736 |

* cited by examiner

*Primary Examiner* — Omoniyi Obayanju
(74) *Attorney, Agent, or Firm* — Merchant & Gould P.C.

(57) ABSTRACT

A system for automatically initiating a travel mode of a media-playback device is disclosed. The system operates to evaluate vehicle presence factors and determine whether the vehicle presence factors indicate that the media-playback device is in a vehicle. Upon determining presence of the media-playback device in a vehicle, the travel mode is performed using the media-playback device.

27 Claims, 15 Drawing Sheets

Vehicle Presence Detection Device — 158

Position and Movement Sensors — 470
- Accelerometer
- Gyroscope
- Magnetometer
- GPS Receiver
- Altimeter
- Odometer
- Speedometer
- Shock Detector
- Vibration Sensor
- Proximity Sensor

Optical Sensors — 472
- Camera
- Infrared Sensor
- Light Sensor

Acoustical Sensors — 474
- Microphone

Thermometer — 476

User Input Detection Device — 478

FIG. 12

VEHICLE DETECTION FOR MEDIA CONTENT PLAYER

CROSS-REFERENCE TO RELATED APPLICATION(S)

This application claims the benefit of U.S. Provisional Application No. 62/441,263, titled VEHICLE DETECTION FOR MEDIA CONTENT PLAYER, filed on Dec. 31, 2016, the disclosure of which is hereby incorporated by reference in its entirety.

BACKGROUND

Many people enjoy consuming media content while travelling or during other activities. The media content can include audio content, video content, or other types of media content. Examples of audio content include songs, albums, podcasts, audiobooks, etc. Examples of video content include movies, music videos, television episodes, etc. Using a mobile phone or other media-playback device, such as a vehicle-integrated media-playback device, a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select desired media content or media content that complements a particular moment while traveling. Further, consuming media content while traveling, such as driving, raises safety issues. Therefore, it may be desirable to run a media-playback device in a different mode suited to improve user experience while traveling or performing other activities.

SUMMARY

In general terms, this disclosure is directed to vehicle detection for media content player. In one possible configuration and by non-limiting example, the vehicle detection system and method are configured to automatically initiate a travel mode of a media-playback device. Various aspects are described in this disclosure, which include, but are not limited to, the following aspects.

One aspect is a method for automatically initiating a travel mode of a media-playback device. The method includes evaluating at least one vehicle presence factor; determining that the at least one vehicle presence factor indicates that the media-playback device is in a vehicle; and initiating a travel mode for media playback using the media-playback device.

Another aspect is a media delivery system including: a processing device; and at least one non-transitory computer readable data storage device storing instructions that, when executed by the processing device, cause the media delivery system to: evaluate at least one vehicle presence factor; determine that the at least one vehicle presence factor indicates that a media-playback device is in a vehicle; initiate a travel mode using the media-playback device; and provide media content items to the media-playback device.

Yet another aspect is a media-playback device including a processing device; and at least one non-transitory computer readable data storage device storing instructions that, when executed by the processing device, cause the media-playback device to: detect at least one vehicle presence factor; determine that the at least one vehicle presence factor indicates that the media-playback device is in a vehicle; perform a travel mode; and play back media content items.

A further aspect is a computer readable storage device storing data instructions, which when executed by a processing device, cause the processing device to: evaluate at least one vehicle presence factor; determine that the at least one vehicle presence factor indicates that the media-playback device is in a vehicle; and initiate a travel mode for media playback using the media-playback device.

Another aspect is a computer readable storage device storing data instructions, which when executed by a processing device, cause the processing device to: detect at least one vehicle presence factor; determine that the at least one vehicle presence factor indicates that the media-playback device is in a vehicle; operate a media-playback device in a travel mode; and play back media content items using the media-playback device while the media-playback device is operating in the travel mode.

BRIEF DESCRIPTION OF THE DRAWINGS

FIG. 12 illustrates an example vehicle presence factor detection device.

DETAILED DESCRIPTION

Figure 1:
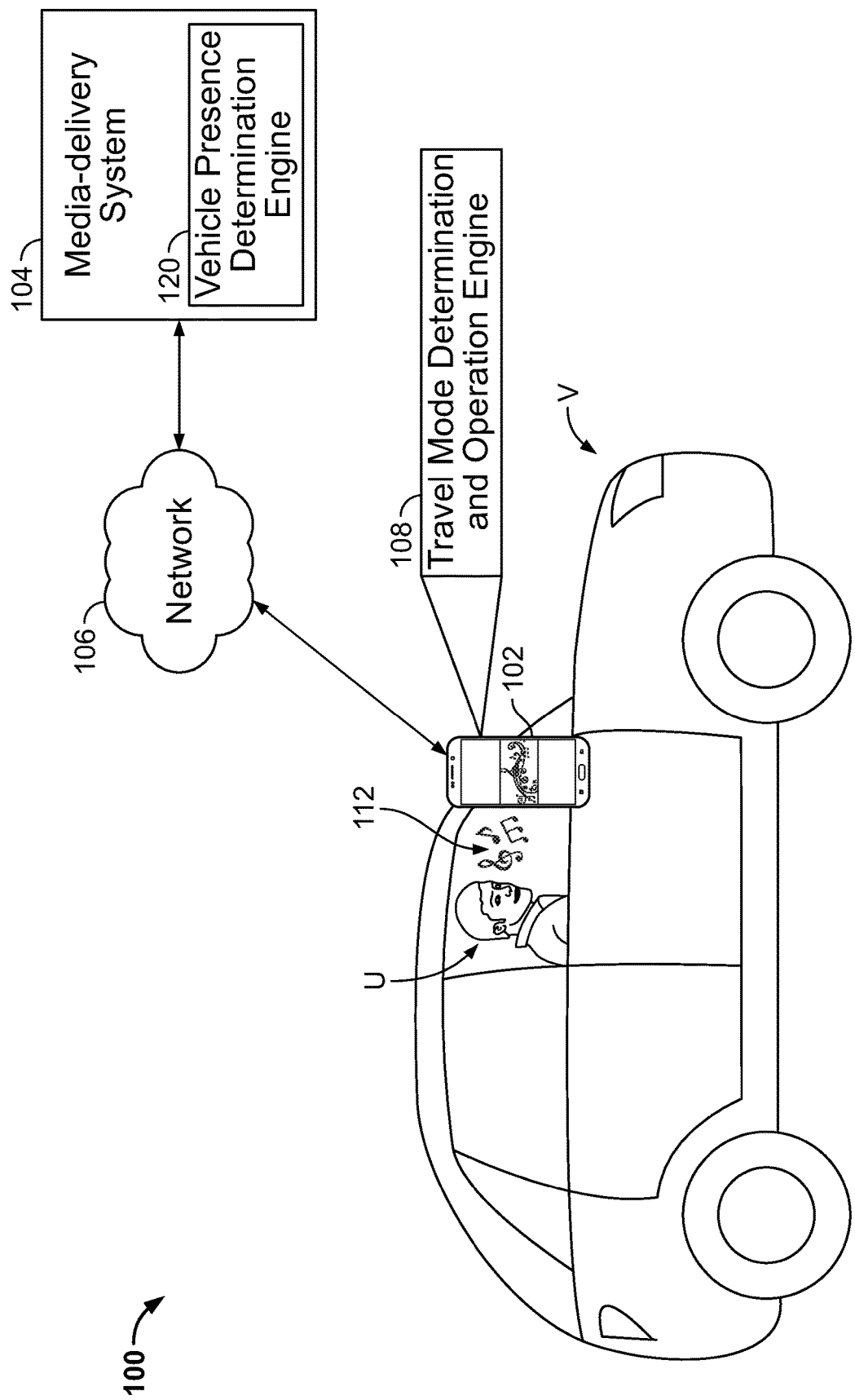
FIG. 1 illustrates an example media-playback system for media content playback during travel.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content during various activities, including travelling. As used herein, the term "travel" and variants thereof refers to any activity in which a user is in transit between two locations. For example, a user is in transit when being conveyed by a vehicle, including motorized and non-motorized, public transit and private vehicles. A user is also in transit when moving between locations by other means such as walking and running.

Enjoying media content while travelling presents many challenges. First, it can be difficult to safely interact with a media-playback device while traveling in a manner that does not interfere with travel related activities (driving, navigating, etc.). Second, desired media content may not be available or accessible in a format that can be accessed while travelling. Third, accessing media content while travelling may be difficult, expensive, or impossible depending on network availability/capacity along the route of travel. Fourth, accessing and playing back media content can require a lot of energy, potentially draining a battery in the media-playback device. Fifth, it can be challenging to connect a media-playback device to a vehicle-embedded audio system for playback while travelling in a vehicle. Embodiments disclosed herein address some or all of these challenges. It should be understood, however, that aspects described herein are not limited to use during travel.

For example, in some embodiments, the media-playback device operates either in a normal mode or a travel mode. The media-playback device operates in the normal mode by default. Under certain conditions, the media-playback device operates in a travel mode. In some embodiments, the travel mode is automatically initiated upon determination of presence of the media-playback device in a vehicle.

The travel mode allows the media-playback device to perform various functionalities that are not performed in the normal mode. In one example, the travel mode includes a limited-attention interface that requires less attention from the user and/or is less distracting than a standard interface. This limited-attention interface can be useful during travelling because a user may have limited attention available for interacting with a media-playback device due to the need to concentrate on travel related activities, including for example driving and navigating. But the limited-attention interface can also be useful during other activities that require the user's concentration, such as exercising, playing games, operating heavy equipment, reading, studying, etc.

Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, travelling and in particular driving is described as one example of an activity during which media content is consumed. However, it should be understood that the same concepts are equally applicable to other forms of media consumption and to other activities, and at least some embodiments include other forms of media consumption and/or are configured for use during other activities.

FIG. 1 illustrates an example media-playback system 100 for media content playback during travel. The system 100 includes a media-playback device 102 and a media delivery system 104. The system 100, such as the media-playback device 102 and the media delivery system 104, can communicate across a network 106. The media delivery system 104 includes a vehicle presence determination engine 120. The media-playback device 102 includes a travel mode determination and operation engine 108, and the media delivery system 104 includes a vehicle presence determination engine 120. Also shown is a user U who is travelling in a vehicle V.

The system 100 is configured to detect vehicle presence with respect to the media-playback device 102 and enable the media-playback device 102 to automatically switch from a normal mode to a travel mode upon detection of vehicle presence. A travel mode is described with reference to FIG. 7. In this document, the "vehicle presence" and variants thereof include a condition where the media-playback device 102 is placed inside a vehicle V or proximate to the vehicle V. Further, presence in a vehicle or inside a vehicle includes a situation where the media-playback device 102 is present either in a vehicle (e.g., inside, within, or at the interior of the vehicle) or adjacent to the vehicle.

A user U can move or travel using a vehicle V. The vehicle V is anything which can transport the user U between different locations. The vehicle V includes motorized and non-motorized, public transit and private vehicles. Examples of the vehicle include bicycles, motor vehicles (e.g., motorcycles, cars, trucks, buses, lawn mowers, heavy machinery, etc.), railway vehicles (e.g., trains, trams, etc.), watercraft (e.g., ships, boats, etc.), aircraft and spacecraft.

The media-playback device 102 plays back media content items to produce media output 110. In some embodiments, the media content items are provided by the media delivery system 104 and transmitted to the media-playback device 102 using the network 106. A media content item is an item of media content, including audio, video, or other types of media content, which may be stored in any format suitable for storing media content. Non-limiting examples of media content items include songs, albums, audiobooks, music videos, movies, television episodes, podcasts, other types of audio or video content, and portions or combinations thereof.

In some embodiments, the media-playback device 102 plays media content for the user during travel or other activities. The media content that is played back may be selected based on user input or may be selected without user input. The media content may be selected for playback without user input by either the media-playback device 102 or the media delivery system 104. For example, media content can be selected for playback without user input based on stored user profile information, location, travel conditions, current events, and other criteria. User profile information includes but is not limited to user preferences and historical information about the user's consumption of media content. User profile information can also include libraries and/or playlists of media content items associated with the user. User profile information can also include information about the user's relationships with other users (e.g., associations between users that are stored by the media delivery system 104 or on a separate social media site). Where user data is used, it can be handled according to a defined user privacy policy and can be used to the extent allowed by the user. Where the data of other users is used, it can be handled in an anonymized matter so the user does not learn of the details of other users generally or specifically. An example of the media-playback device 102 is further described herein including the description with reference to FIG. 2.

The media delivery system 104 operates to provide the media content items to the media-playback device 102 via the network 106. An example of the media delivery system 104 is further described herein including the description with reference to FIG. 3.

The travel mode determination and operation engine 108 of the media-playback device 102 operates to determine whether one or more predetermined conditions are met to trigger a travel mode, and perform the travel mode upon determination. In some embodiments, the travel mode determination and operation engine 108 can further detect vehicle presence either in cooperation with or independently from the media delivery system 104. An example of the travel mode determination and operation engine 108 is described in more detail with reference to FIG. 2.

The vehicle presence determination engine 120 of the media delivery system 104 operates to determine whether the media-playback device 102 is present in a vehicle V (i.e., vehicle presence). In some embodiments vehicle presence determination engine 120 determines whether the media-playback device 102 is traveling. The vehicle presence determination engine 120 can cooperate with the media-playback device 102 to make such determination of vehicle presence or whether it is travelling. An example of the vehicle presence determination engine 120 is further described with reference to FIG. 3.

Figure 2:
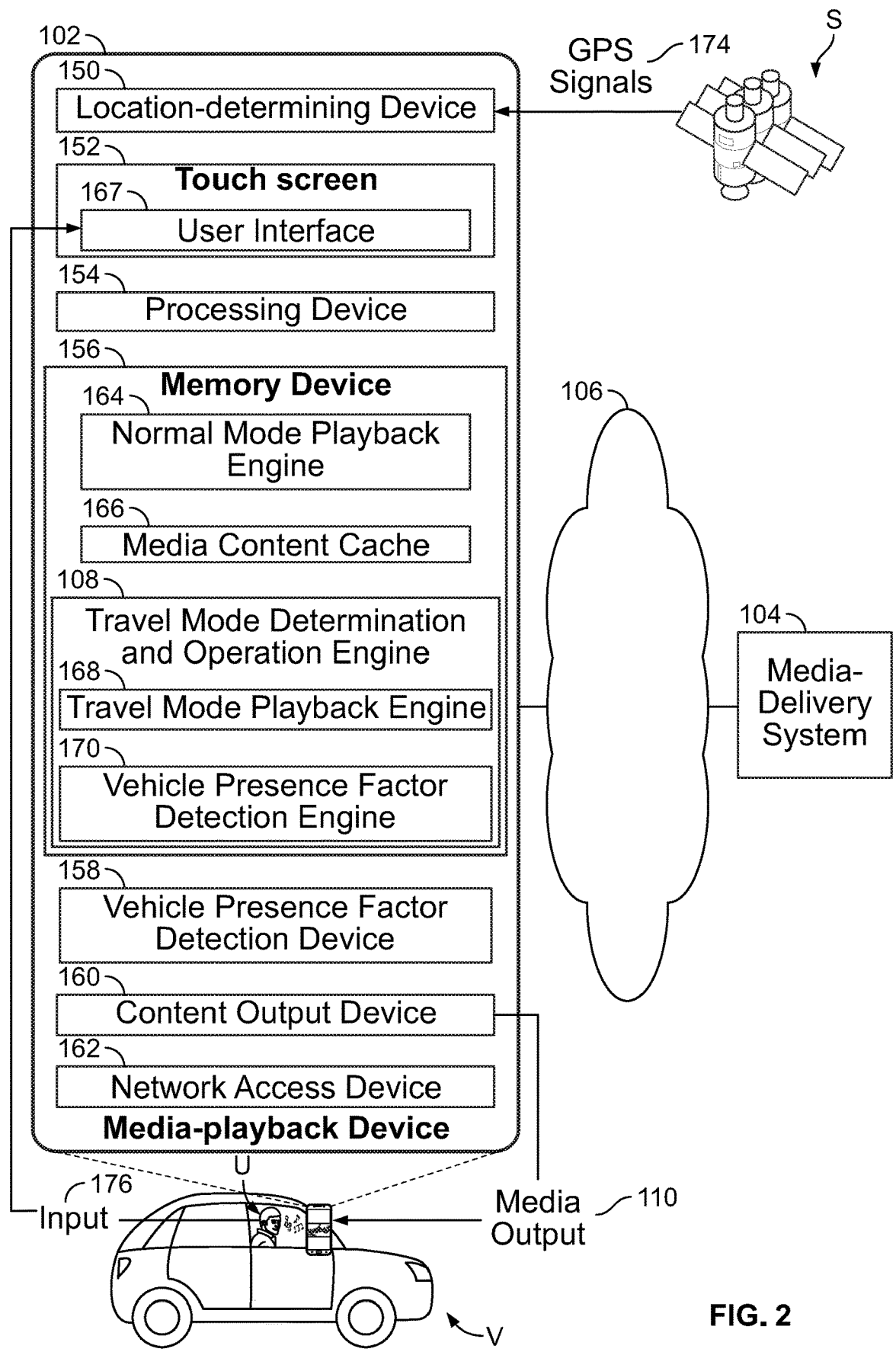
FIG. 2 is a schematic illustration of the media-playback device of FIG. 1.

FIG. 2 is a schematic illustration of the media-playback device 102 of FIG. 1, which can communicate with the media delivery system 104 via the network 106. Also shown are the user U in the vehicle V and satellites S.

As noted above, the media-playback device 102 plays media content items. In some embodiments, the media-playback device 102 plays media content items that are provided (e.g., streamed, transmitted, etc.) by a system external to the media-playback device such as the media delivery system 104, another system, or a peer device. Alternatively, in some embodiments, the media-playback device 102 plays media content items stored locally on the media-playback device 102. Further, in at least some embodiments, the media-playback device 102 plays media content items that are stored locally as well as media content items provided by other systems.

In some embodiments, the media-playback device 102 is a portable computing device, which can be carried into a vehicle V or proximate to the vehicle V. Such a portable computing device includes a handheld entertainment device, smartphone, tablet, watch, wearable device, or any other type of device capable of playing media content. In other embodiments, the media-playback device 102 is an in-dash vehicle computer, a laptop computer, desktop computer, television, gaming console, set-top box, network appliance, blue-ray or DVD player, media player, stereo, radio or any portable devices suitable for playing back media content.

In at least some embodiments, the media-playback device 102 includes a location-determining device 150, a touch screen 152, a processing device 154, a memory device 156, a vehicle presence factor detection device 158, a content output device 160, and a network access device 162. Other embodiments may include additional, different, or fewer components.

The location-determining device 150 is a device that determines the location of the media-playback device 102. In some embodiments, the location-determining device 150 uses one or more of the following technologies: Global Positioning System (GPS) technology which may receive GPS signals 174 from satellites S, cellular triangulation technology, network-based location identification technology, Wi-Fi positioning systems technology, and combinations thereof.

The touch screen 152 operates to receive an input 176 from a selector (e.g., a finger, stylus etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 167 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 156 operates to store data and instructions. In some embodiments, the memory device 156 stores instructions for a normal mode playback engine 164, a media content cache 166, and the travel mode determination and operation engine 108 that includes a travel mode playback engine 168 and a vehicle presence factor detection engine 170.

The normal mode playback engine 164 is configured to implement a normal mode in the media-playback device 102. In some embodiments, the normal mode playback engine 164 selects and plays back media content and generates interfaces for selecting and playing back media content items. An example of the normal mode of the media-playback device 102 is described in more detail with reference to FIG. 7.

Some embodiments of the memory device also include a media content cache 166. The media content cache 166 stores media-content items, such as media content items that have been previously received from the media delivery system 104. The media content items stored in the media content cache 166 may be stored in an encrypted or unencrypted format. The media content cache 166 can also store metadata about media-content items such as title, artist name, album name, length, genre, mood, era, etc. The media content cache 166 can also store playback information about the media content items, such as the number of times the user has requested to playback the media content item or the current location of playback (e.g., when the media content item is an audiobook, podcast, or the like for which a user may wish to resume playback).

As described herein, the media-playback device 102 includes the travel mode determination and operation engine 108. In some embodiments, the travel mode determination and operation engine 108 includes a travel mode playback engine 168 configured to implement a travel mode. As described herein, some embodiments of the travel mode playback engine 168 include a limited-attention media-playback engine that generates interfaces for selecting and playing back media content items. In at least some embodiments, the limited-attention media-playback engine generates interfaces that are configured to be less distracting to a user and require less attention from the user than other interfaces generated by the normal mode playback engine 164. For example, interface generated by the limited-attention media-playback engine may include fewer features than the other interfaces generated by the normal mode playback engine 164. These interfaces generated by the limited-attention media-playback engine may make it easier for the user to interact with the media-playback device 102 during travel or other activities that require the user's attention.

The travel mode determination and operation engine 108 further includes a vehicle presence factor detection engine 170 configured to detect one or more vehicle presence factors. The vehicle presence factors include factors which can be used to determine, infer, or predict presence of the media-playback device 102 in a vehicle V. In some embodiments, the vehicle presence factors, either individually or in combination, include information that directly indicates or suggests presence of the media-playback device 102 within or proximate to a vehicle V. In other embodiments, the vehicle presence factors, either individually or in combination, include information that implies the presence of the media-playback device 102. As described herein, in some embodiments, the vehicle presence determination engine 120 in the media delivery system 104 can use the vehicle presence factors to determine presence of the media-playback device 102 in a vehicle V. In some embodiments, the vehicle presence factor detection engine 170 communicates with a vehicle presence factor detection device 158 to obtain one or more of the vehicle presence factors.

Referring still to FIG. 2, the vehicle presence factor detection device 158 of the media-playback device 102 operates to detect vehicle presence factors. In some embodiments, the vehicle presence factors include data associated with the media-playback device 102, which is further described herein including the description with reference to FIG. 10. The vehicle presence factor detection device 158 can include one or more sensors or detectors, some of which are illustrated in FIG. 12.

The content output device 160 operates to output media content. In some embodiments, the content output device 160 generates media output 110 for the user U. Examples of the content output device 160 include a speaker assembly comprising one or more speakers, an audio output jack, a Bluetooth transmitter, a display panel, and a video output jack. Other embodiments are possible as well. For example, the content output device 160 may transmit a signal through the audio output jack or Bluetooth transmitter that can be used to reproduce an audio signal by a connected or paired device such as headphones or a speaker. As described herein, the media-playback device 102 is connected to the vehicle media-playback system 264 such that the content output device 160 generates the media output 110 through the vehicle media-playback system 264. An example connection to the vehicle media-playback system 264 is described herein including the description with reference to FIGS. 4C and 4D.

The network access device 162 operates to communicate with other computing devices over one or more networks, such as the network 106. Examples of the network access device include one or more wired network interfaces and wireless network interfaces. Examples of wireless network interfaces include infrared, BLUETOOTH® wireless technology, 802.11a/b/g/n/ac, and cellular or other radio frequency interfaces.

With reference still to FIG. 2, the network 106 is an electronic communication network that facilitates communication between the media-playback device 102 and the media delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, stand-alone server devices, blade server devices, sensors, desktop computers, firewall devices, laptop computers, handheld computers, mobile telephones, vehicular computing devices, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more vehicle are networks, local area networks (LANs), metropolitan area networks, subnets, wide area networks (such as the Internet), or can be implemented at another scale. Further, in some embodiments, the network 106 includes multiple networks, which may be of the same type or of multiple different types.

Figure 3:
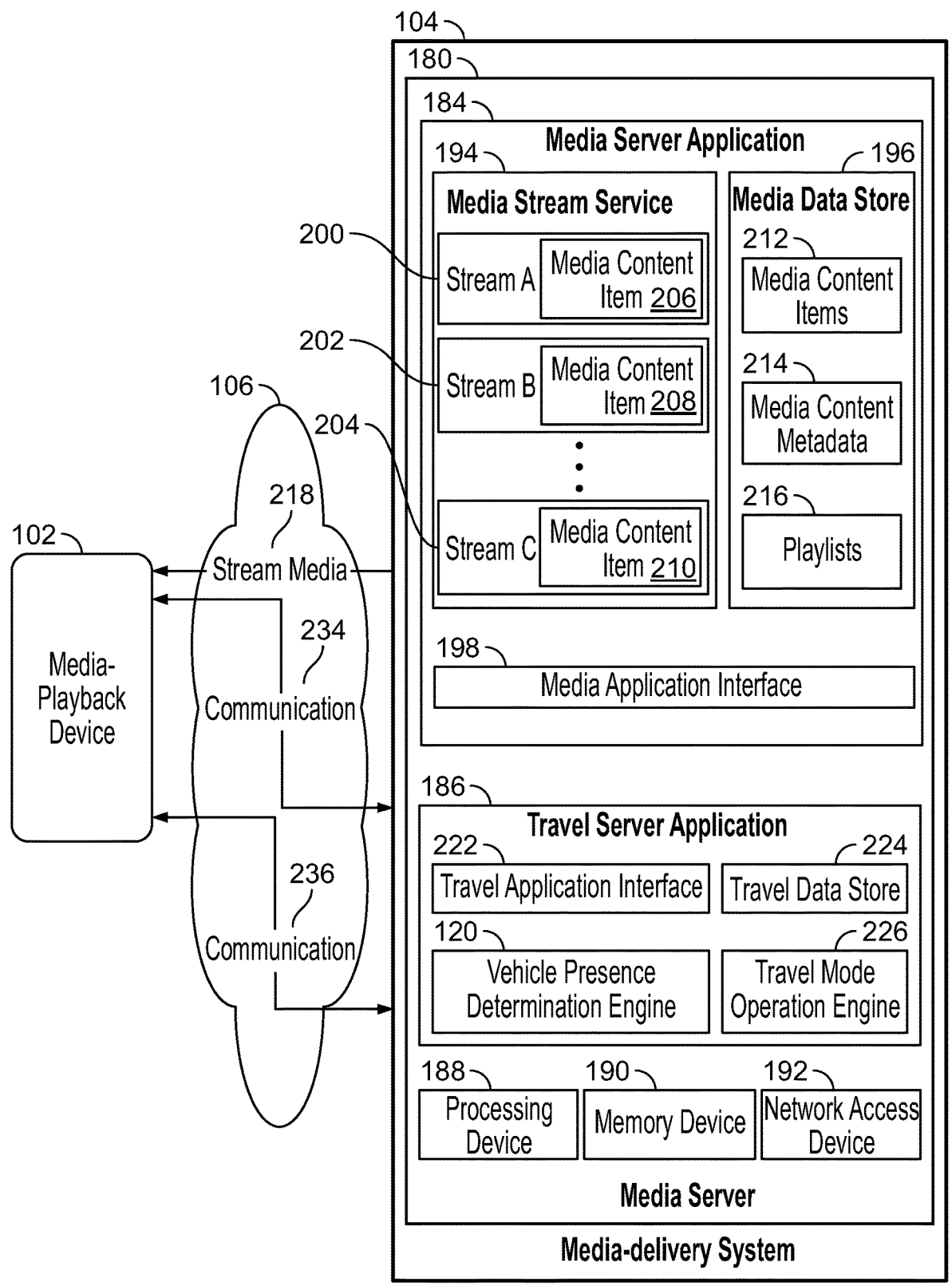
FIG. 3 is a schematic illustration of the media delivery system of FIG. 1.

FIG. 3 is a schematic illustration of the media delivery system 104 of FIG. 1, which can communicate with the media-playback device 102 via the network 106.

The media delivery system 104 comprises one or more computing devices and provides media content items to the media-playback device 102 and, in some embodiments, other media-playback devices as well. The media delivery system 104 includes a media server 180. Although FIG. 3 shows a single media server 180, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel, etc.). Various combinations thereof are possible as well.

The media server 180 transmits stream media 218 to media-playback devices such as the media-playback device 102. In some embodiments, the media server 180 includes a media server application 184, a travel server application 186, a processing device 188, a memory device 190, and a network access device 192. The processing device 188, memory device 190, and network access device 192 may be similar to the processing device 154, memory device 156, and network access device 162 respectively, which have each been previously described.

In some embodiments, the media server application 184 streams music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the playback engines 164 and 168.

In some embodiments, the media data store 196 stores media content items 212, media content metadata 214, and playlists 216. The media data store 196 may comprise one or more databases and file systems. Other embodiments are possible as well. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212 and. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. The playlists 216 may include user-created playlists, which may be available to a particular user, a group of users, or to the public.

The travel server application 186 provides travel-specific functionality for accessing media content items to media-playback devices. In some embodiments, the travel server application 186 includes the vehicle presence determination engine 120 as described herein. In addition, the travel server application 186 can include a travel application interface 222, a travel data store 224, and a travel mode operation engine 226.

As described herein, the vehicle presence determination engine 120 operates to determine vehicle presence with respect to the media-playback device 102. For example, the vehicle presence determination engine 120 determines whether the media-playback device 102 is located in the vehicle V. In some embodiments, the vehicle presence determination engine 120 uses data, such as vehicle presence factors, obtained and/or generated using the media-playback device 102. For example, the vehicle presence determination engine 120 operates to infer presence of the media-playback device 102 in a vehicle V based on data detected and/or evaluated by the media-playback device 102. In other embodiments, the vehicle presence determination engine 120 can use data from other sources to determine the vehicle presence. An example of the vehicle presence determination engine 120 is further described herein including the description with reference to FIG. 9.

The travel application interface 222 can receive requests or other communication from media-playback devices or other systems, to retrieve travel information and media content items for playback during travel. For example, in FIG. 3, the travel application interface 222 of the travel server application 186 receives communication 236 from at least one of the normal mode playback engine 164 and the travel move determination and operation engine 108.

The travel data store 224 is used to store metadata and other information that associates media content items to geographic locations, forms of travel, travel conditions, etc. Further, the travel server application 186 may also store information that associates media content items with an individual or group of users' preferences for consuming that media content during travel in the travel data store 224. The travel data store 224 may comprise one or more files or databases. The travel data store 224 can also comprise files, tables, or fields in the media data store 196.

In some embodiments, the travel data store 224 stores travel media metadata. The travel media metadata may include various types of information associated with media content items, such as the media content items 212. In some embodiments, the travel data store 224 provides information that may be useful for selecting media content items for playback during travel. For example, in some embodiments, the travel data store 224 stores travel scores for media content items that correspond to the suitability of particular media content items for playback during travel. As another example, in some embodiments, the travel data store 224 stores timestamps (e.g., start and end points) that identify portions of media content items that are particularly well-suited for playback during travel (or other activities).

The travel mode operation engine 226 of the travel server application 186 is configured to perform a travel mode. In some embodiments, the travel mode operation engine 226 transmits data to the media-playback device 102 to perform the travel mode using the media-playback device 102.

In one example, the travel mode operation engine 226 generates interfaces that are transmitted to the media-playback device 102 for use by the limited-attention media-playback engine. In some embodiments, the travel mode operation engine 226 generates limited-attention interfaces by modifying other interfaces (e.g., interfaces in the normal mode) to identify (e.g., with tags) user interface elements that behave differently or should be rendered differently on a limited-attention interface.

Additionally, the travel mode operation engine 226 of the travel server application 186 can process data and user input information received from the media-playback device 102. In some embodiments, the travel mode operation engine 226 operates to transmit information about the suitability of one or more media content items for playback during travel. In some embodiments, the travel mode operation engine 226 may provide a list of media content items that are suited to particular geographic locations, travel conditions, mode of travel, user preferences, etc.

In FIGS. 2 and 3, each of the media-playback device 102 and the media delivery system 104 can include additional physical computer or hardware resources. In at least some embodiments, the media-playback device 102 communicates with the media delivery system 104 via the network 106.

Although in FIGS. 2 and 3 only a single media-playback device 102 and media delivery system 104 are shown, in accordance with some embodiments, the media delivery system 104 can support the simultaneous use of multiple media-playback devices, and the media-playback device can simultaneously access media content from multiple media delivery systems. Additionally, although FIGS. 2 and 3 illustrate a streaming media based system for media playback during travel, other embodiments are possible as well. For example, in some embodiments, the media-playback device 102 includes a media data store 196 and the media-playback device 102 is configured to perform select and playback media content items without accessing the media delivery system 104. Further in some embodiments, the media-playback device 102 operates to store previously streamed media content items in a local media data store (e.g., the media content cache 166).

In at least some embodiments, the media delivery system 104 can be used to stream, progressively download, or otherwise communicate music, other audio, video, or other forms of media content items to the media-playback device 102 for playback during travel on the media-playback device 102. In accordance with an embodiment, a user U can direct the input 176 to the user interface 167 to issue requests, for example, to playback media content for playback during travel on the media-playback device 102.

Figure 4A:
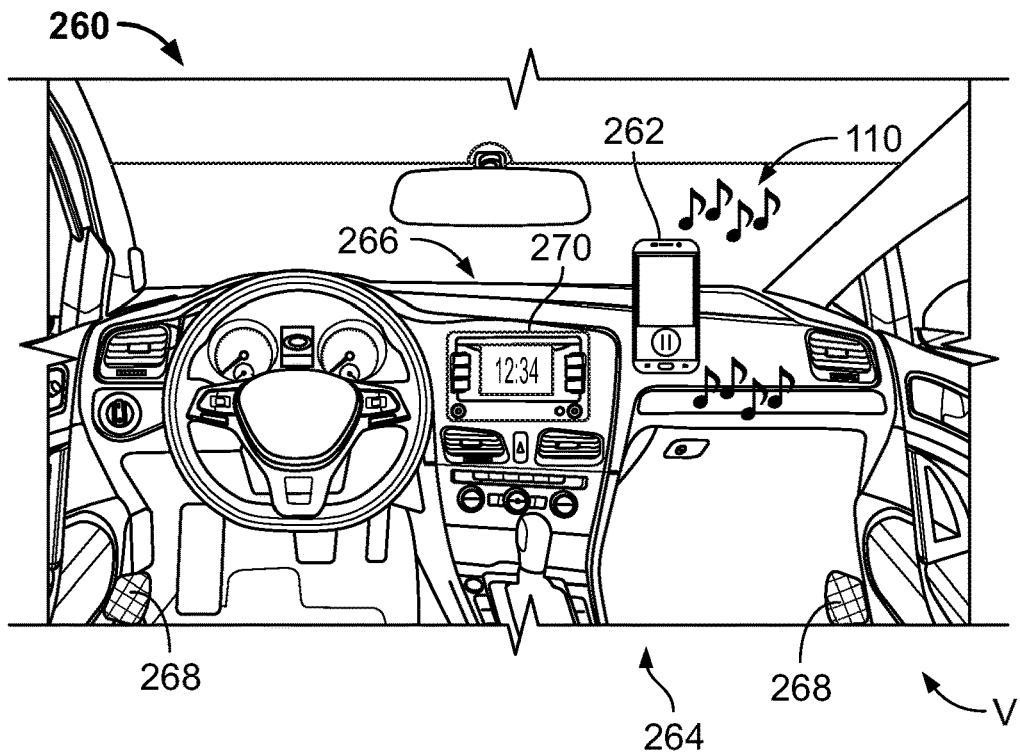
FIG. 4A is a schematic diagram of an embodiment of the media-playback system of FIG. 1.

FIG. 4A is a schematic diagram of an embodiment of a media-playback system 260 shown within an interior cabin of the vehicle V. The media-playback system 260 is an example of the media-playback system 100.

In this example, the media-playback system 260 includes a media-playback device 262. The media-playback device 262 is an embodiment of the media-playback device 102. Although not shown in this figure, some embodiments of the media-playback system 260 also include a media-delivery system such as the media delivery system 104.

Also shown in this figure, is a vehicle media-playback system 264. The vehicle media-playback system 264 is capable of generating media output 110 within the interior cabin of the vehicle V. An example of the vehicle media-playback system 264 is illustrated and described with respect to FIG. 5.

As shown in FIG. 4A, the vehicle media-playback system 264 includes a vehicle head unit 266 and a speaker assembly 268. The vehicle head unit 266 receives or generates media content signals from one or more sources. As shown in FIG. 2, the vehicle head unit 266 includes a display device 270, which can be used to display information about the selected or available sources of media content. In some embodiments, the display device 270 can also display media content. Typically, the vehicle head unit 266 also includes a user input assembly that is usable to control the vehicle media-playback system 264 and to select a source of media content. The vehicle head unit 266 then transmits those signals to output devices such as the speaker assembly 268 (sometimes via an amplifier). In some embodiments, the vehicle head unit 266 also generates image or video content signals that can be transmitted to the display device 270 or another device for display.

In FIG. 4A, the vehicle media-playback system 264 is not being used to generate media output. Instead, the media-playback device 262 is generating media output 110 directly (e.g., through a speaker or other content output device of the media-playback device 262).

Figure 4B:
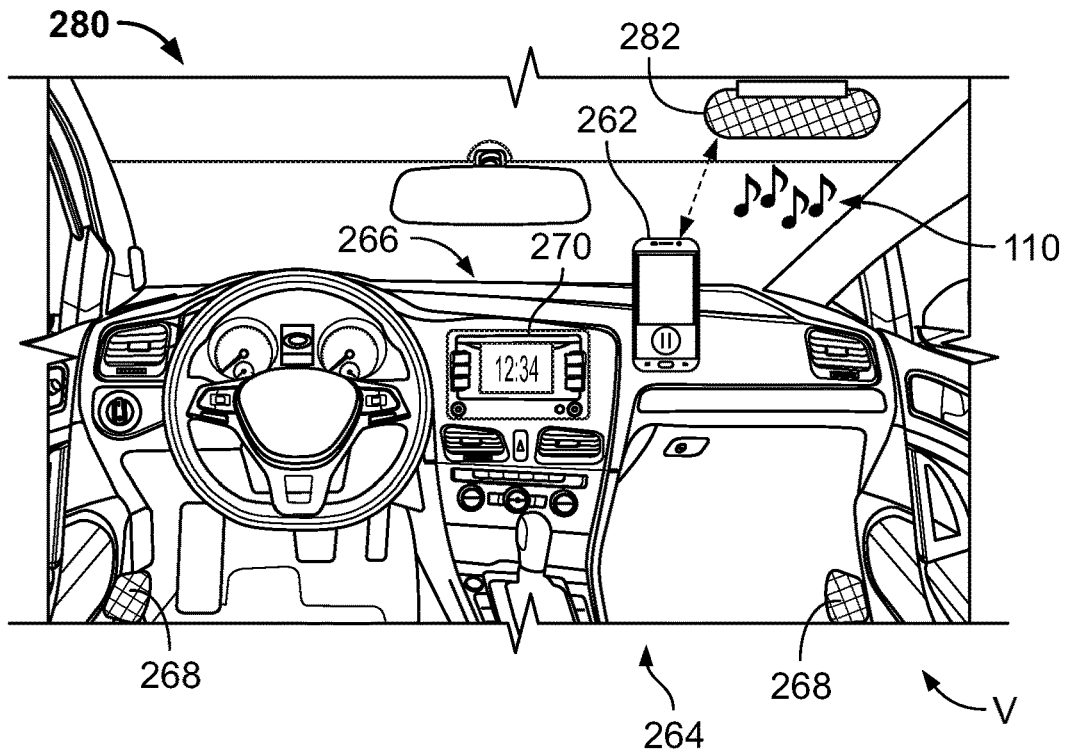
FIG. 4B is a schematic diagram of another embodiment of the media-playback system of FIG. 1.

FIG. 4B is a schematic diagram of an embodiment of a media-playback system 280. The media-playback system 280 is an example of the media-playback system 100. The media-playback system 280 includes the media-playback device 262 and an external speaker assembly 282. The vehicle media-playback system 264 is also shown in FIG. 4B.

The external speaker assembly 282 generates media output 110 based on a signal received from the media-playback device 262. The external speaker assembly 282 can include one or more speakers. The external speaker assembly 282 can also include a mechanical apparatus for attachment to the vehicle. Although alternatives are possible, in FIG. 4B, the external speaker assembly 282 is attached to a sun visor of the vehicle.

In some embodiments, the media-playback device 262 connects to the external speaker assembly 282 using Bluetooth. The media-playback device 262 then transmits an audio signal to the external speaker assembly 282 via Bluetooth, which is then used by the external speaker assembly 282 to generate the media output 110. In some embodiments, the media-playback device 262 and the external speaker assembly 282 communicate using a different wireless protocol. Further, in some embodiments, the media-playback device 262 can transmit a media content signal to the external speaker assembly 282 via a cable (e.g., an analog or digital audio cable, a universal serial bus (USB) cable).

In FIG. 4B, the vehicle media-playback system 264 is not being used to generate media output. Instead, the media-playback device 262 is transmitting a signal to the external speaker assembly 282, which generates the media output 110 without using the vehicle media-playback system 264.

Figure 4C:
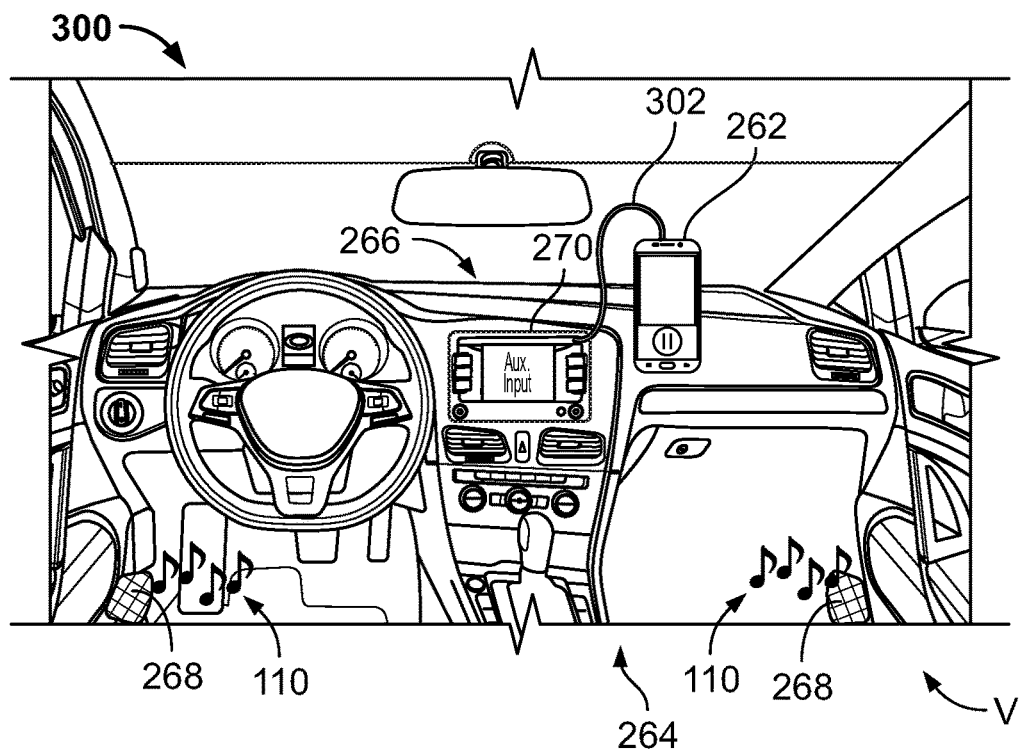
FIG. 4C is a schematic diagram of another embodiment of the media-playback system of FIG. 1.

FIG. 4C is a schematic diagram of an embodiment of a media-playback system 300. The media-playback system 300 is an example of the media-playback system 100. The media-playback system 300 includes the media-playback device 262, the vehicle media-playback system 264, and a cable 302.

The cable 302 connects the media-playback device 262 to the vehicle media-playback system 264. Although alternatives are possible, the cable 302 can be an analog audio cable that is connects an audio output device of the media-playback device 262 (e.g., a headphone jack) to a wired input device of the vehicle media-playback system 264 (e.g., an auxiliary input jack). In alternative embodiments, the cable 302 is a USB cable that connects the media-playback device 262 to the vehicle media-playback system 264.

As shown in FIG. 4C, the display device 270 indicates that the vehicle media-playback system 264 is generating media output 110 based on a signal received from an auxiliary input. The media output 110 is played within the interior cabin of the vehicle by the vehicle media-playback system 264 using the speaker assembly 268.

Figure 4D:
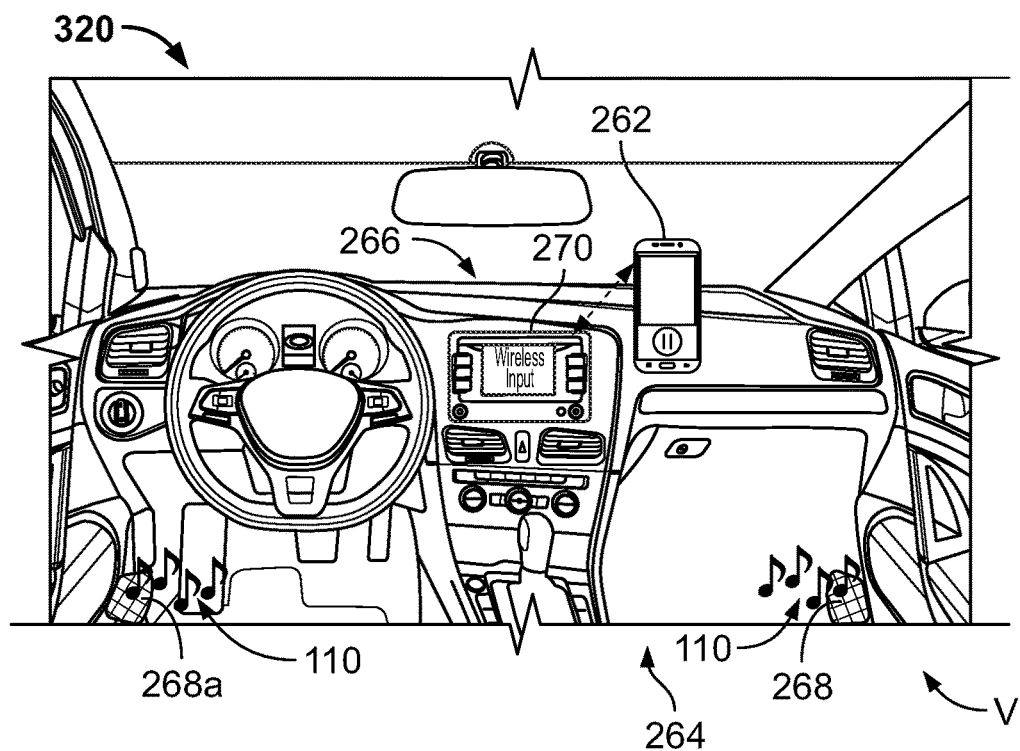
FIG. 4D is a schematic diagram of another embodiment of the media-playback system of FIG. 1.

FIG. 4D is a schematic diagram of an embodiment of a media-playback system 320. The media-playback system 320 is an example of the media-playback system 100. The media-playback system 320 includes the media-playback device 262 and the vehicle media-playback system 264. In this example, the media-playback device 262 and the vehicle media-playback system 264 are connected using a wireless communication protocol. Although alternatives are possible, the media-playback device 262 and the vehicle media-playback system 264 can be connected using Bluetooth. As an alternative, the media-playback device 262 and the vehicle media-playback system 264 can be connected via a Wi-Fi network (e.g., using an 802.11 wireless communication protocols) or another type of wireless connection.

As shown in FIG. 4D, the display device 270 indicates that the vehicle media-playback system 264 is generating media output 110 based on a signal received from a wireless input. The media output 110 is played within the interior cabin of the vehicle by the vehicle media-playback system 264 using the speaker assembly 268.

Figure 5:
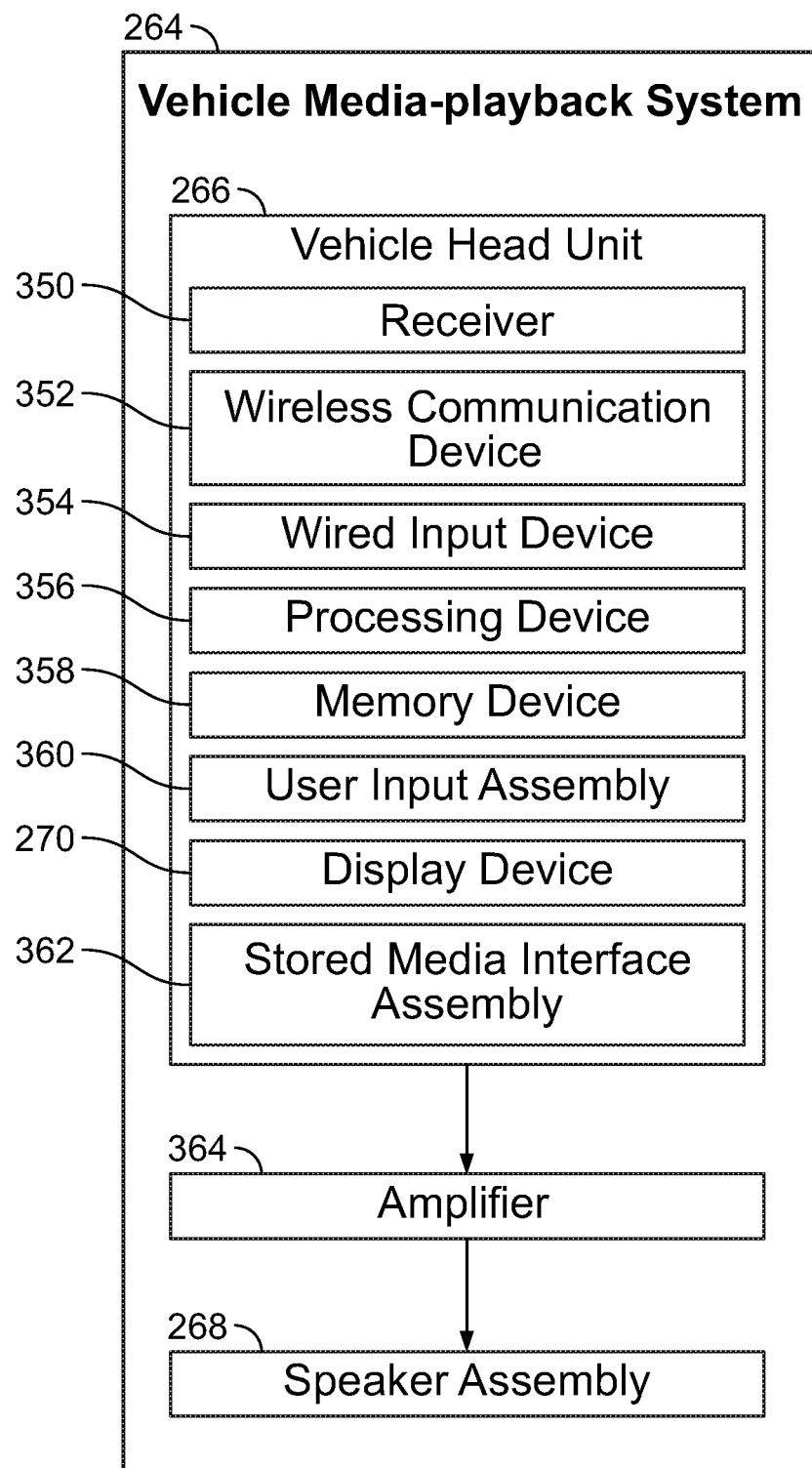
FIG. 5 is a schematic diagram of an embodiment of the vehicle media-playback system of FIGS. 4A-4D.

FIG. 5 is a schematic diagram of an embodiment of the vehicle media-playback system 264. In this example, the vehicle media-playback system 264 includes a vehicle head unit 266, an amplifier 364, and a speaker assembly 268.

The vehicle head unit 266 received user input and generates media content from various sources. In this example, the vehicle head unit 266 includes a receiver 350, a wireless communication device 352, a wired input device 354, a processing device 356, a memory device 358, a user input assembly 360, a display device 270, and a stored media interface assembly 362. The processing device 356 may be similar to the processing device 154 and the memory device 358 may be similar to the memory device 156.

The receiver 350 receives media content signals from various external sources. The received signals can then be used to generate media output by the vehicle media-playback system 264. The receiver 350 may comprise one or more tuners for receiving radio signals such as FM or AM radio signals. Additionally, the receiver 350 may comprise a receiver for receiving satellite radio signals.

The wireless communication device 352 communicates with other devices using wireless data signals. The wireless communication device 352 can include one or more of a Bluetooth transceiver and a Wi-Fi transceiver. The wireless data signal may comprise a media content signal such as an audio or video signal.

The wired input device 354 receives a cable for providing media content and/or commands. In some embodiments, the wired input device 354 can include an auxiliary input jack for receiving a plug that transmits analog audio signals. The wired input device 354 can also include different or multiple input jacks for receiving plugs that transmit other types of analog or digital signals (e.g., USB, HDMI, Composite Video, YPbPr, DVI). In some embodiments, the wired input device 354 is also used to receive instructions from other devices.

The user input assembly 360 comprises one or more input devices for providing user input to the vehicle media-playback system 264. In some embodiments, the user input assembly 360 includes multiple knobs, buttons, and other types of input controls for adjusting volume, selecting sources and content, and adjusting various output parameters. In some embodiments, the various input devices are disposed on or near a front surface of the vehicle head unit 266. The various input devices can also be disposed on the steering wheel of the vehicle or elsewhere. Additionally or alternatively, the user input assembly 360 can include one or more touch sensitive surfaces, which can be incorporated in the display device 270.

The display device 270 displays information. In some embodiments, the display device 270 includes a liquid crystal display (LCD) panel for displaying textual information about content and/or settings of the vehicle media-playback system 264. The display device 270 can also include other types of display panels such as a light emitting diode (LED) panel. In some embodiments, the display device 270 can also display image or video content.

The stored media interface assembly 362 reads media content stored on a physical medium. In some embodiments, the stored media interface assembly 362 comprises one or more devices for reading media content from a physical medium such as a compact disc or cassette tape.

The amplifier 332 amplifies a signal received from the vehicle head unit 266 and transmits the amplified signal to the speaker assembly 268. In this manner, the media output 110 can be played back at a greater volume. The amplifier 332 may include a power source to power the amplification.

The speaker assembly 268 produces an audio output based on an electronic signal. The speaker assembly may comprise one or more speakers disposed at various locations within the vehicle. In some embodiments, separate signals are received for at least some of the speakers (e.g., to provide stereo or surround sound).

Figure 6:
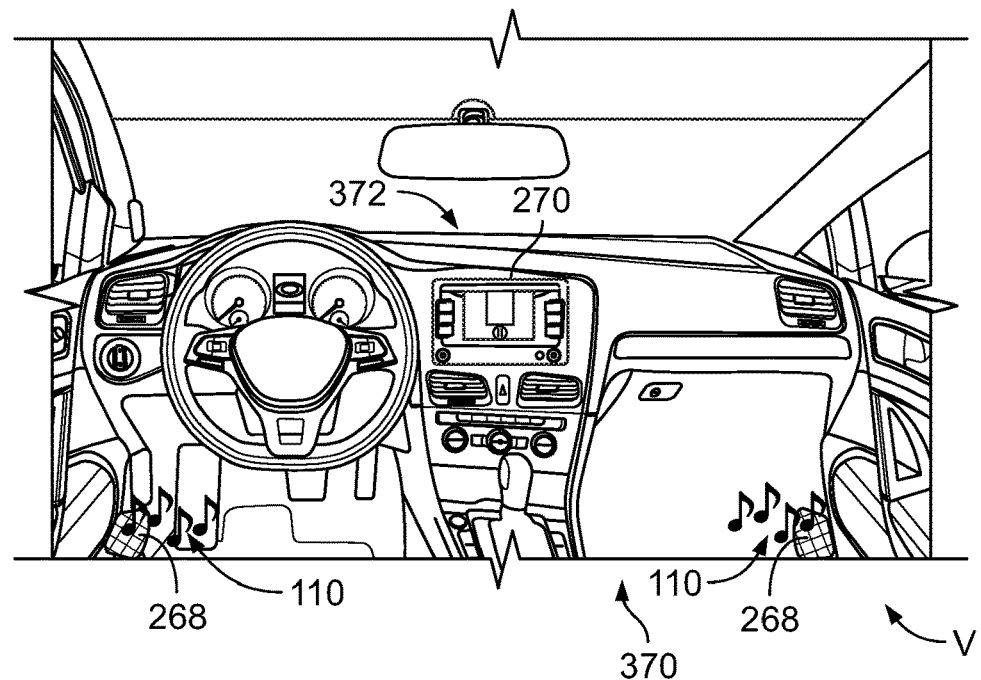
FIG. 6 is a schematic diagram of an embodiment of a vehicle media-playback system that incorporates a media-playback device.

FIG. 6 is a schematic diagram of an embodiment of a vehicle media-playback system 370 that incorporates a media-playback device. The vehicle media-playback system 370 is an example of the media-playback system 100. The vehicle media-playback system 370 includes a vehicle head unit 372 and the speaker assembly 268. In this example, the vehicle head unit 372 incorporates the components and functionality of both a media-playback device such as the media-playback device 102 and a vehicle head unit such as the vehicle head unit 266. As shown in FIG. 4D, the display device 270 is showing a user interface screen for selecting and playing back media content. The media output 110 is played within the interior cabin of the vehicle by the vehicle media-playback system 370 using the speaker assembly 268. Although alternatives are possible, the vehicle media-playback system 370 often also includes navigation, climate control, and vehicle maintenance capabilities too.

Figure 7:
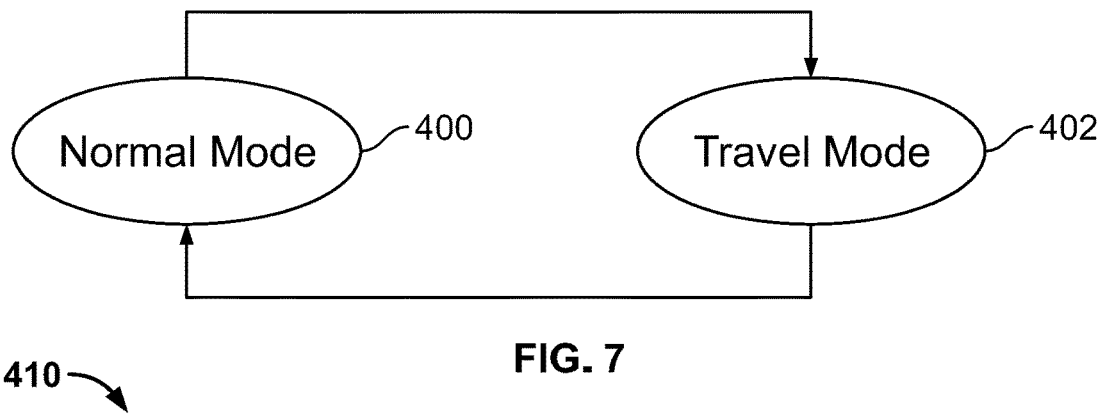
FIG. 7 is a state diagram illustrating a normal mode and a travel mode of a media-playback device.

FIG. 7 is a state diagram illustrating a normal mode 400 and a travel mode 402 of a media-playback device 102. In some embodiments, the normal mode 400 and the travel mode 402 are implemented by the media-playback device 102. In other embodiments, other computing devices, such as the media delivery system 104, can cooperate with the media-playback device 102 to perform the normal mode 400 and the travel mode 402. The normal mode 400 and the travel mode 402 can be selectively performed based on certain conditions. As described herein, the travel mode 402 is switched from the normal mode 400 when the media-playback device 102 is determined to be present in a vehicle.

The normal mode 400 can be any mode other than the travel mode 402. In some embodiments, in the normal mode 400, the media-playback device 102 provides functionalities and interfaces that a user can utilize when the user is not distracted. For example, the normal mode 400 provides interfaces that can be operated by a user who pays usual attention to the interfaces. The normal mode 400 can be implemented when a user is not distracted, such as when a user can remain stationary relative to a place (e.g., the ground, a floor, or a room) where the user is present. For example, the normal mode 400 can be operated when a user is standing, sitting, or lying in a stationary place, carried or transported by a vehicle, or moving at a relatively low speed (e.g., walking or jogging). The normal mode 400 requires a user's typical attention for operation.

The travel mode 402 is a mode suited for a user who is traveling. In some embodiments, the travel mode 402 is a set of functionalities which are performed in the media-playback device 102 while a user is traveling. In some embodiments, the travel mode provides interfaces configured to require less attention from the user and/or is less distracting than a normal mode in the media-playback device 102. In some embodiments, the travel mode provides interfaces for selecting and playing back media content items, which are configured to be less distracting to a user and require less attention from the user than a standard interface. Such limited-attention interfaces can be useful during travelling because a user may have limited attention available for interacting with a media-playback device due to the need to concentrate on travel related activities, including for example driving and navigating.

In other examples, the travel mode provides media content items or playlists thereof that are suited for traveling. For example, in the travel mode, media content items are selected which would interest the user while traveling, such as while commuting in the morning or the evening. Examples of the travel mode 402 are further described with reference to FIG. 17.

Figure 8:
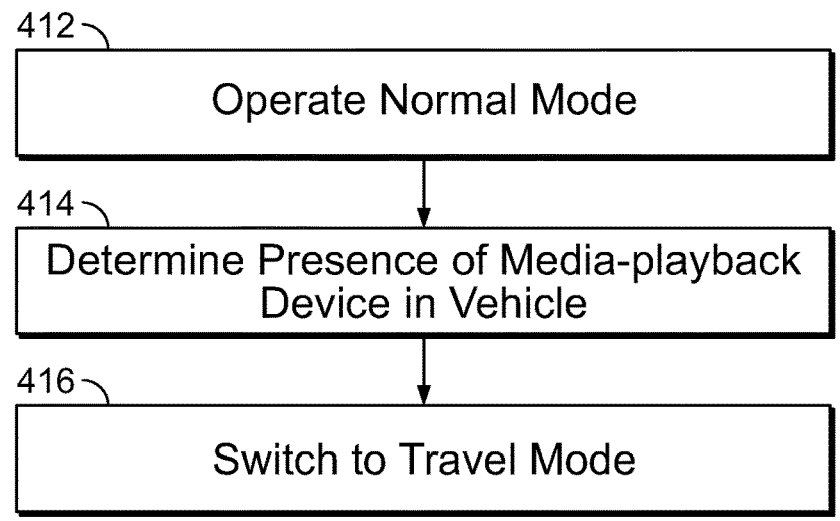
FIG. 8 illustrates an example method for operating a media-playback device.

FIG. 8 illustrates an example method 410 for operating a media-playback device. In some embodiments, as shown in operation 412, the media-playback device 102 operates in the normal mode 400 by default.

At operation 414, it is determined that the media-playback device 102 is present in a vehicle. In some embodiments, the media-playback device 102 and the media delivery system 104 can cooperatively operate to determine such vehicle presence. An example method for determining vehicle presence is described and illustrated with reference to FIG. 9.

At operation 416, upon determining vehicle presence, the media-playback device 102 switches from the normal mode 400 to the travel mode 402. In the illustrated embodiments, the travel mode 402 is performed when the media-playback device 102 is determined to be located in a vehicle V (i.e., upon detection of vehicle presence).

Figure 9:
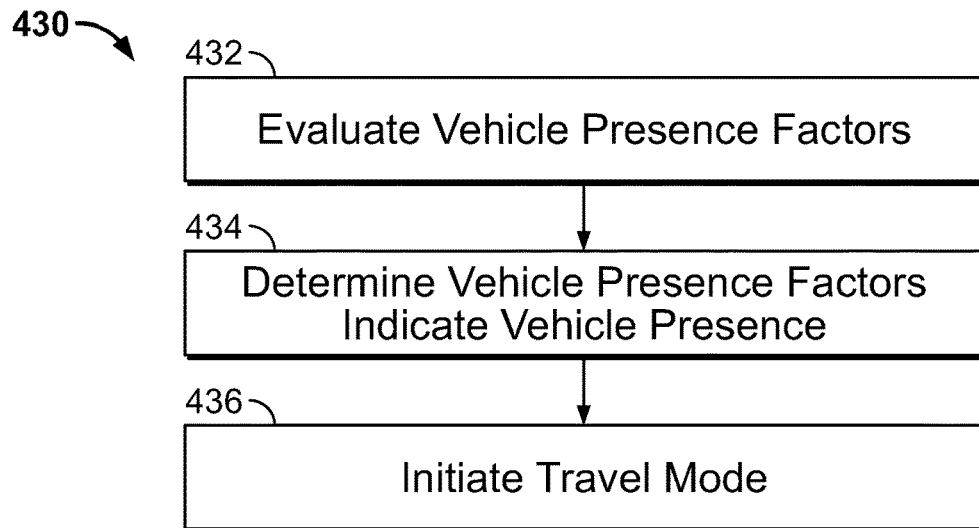
FIG. 9 illustrates an example method for automatically initiating a travel mode of a media-playback device.

FIG. 9 illustrates an example method 430 for automatically initiating a travel mode of a media-playback device 102. In some embodiments, the method 430 is performed by either or both of the media-playback device 102 and the media delivery system 104. It is understood however that one or more other systems or devices can perform the method 430, in cooperation with or independently from the media-playback device 102 and the media delivery system 104.

Figure 10:
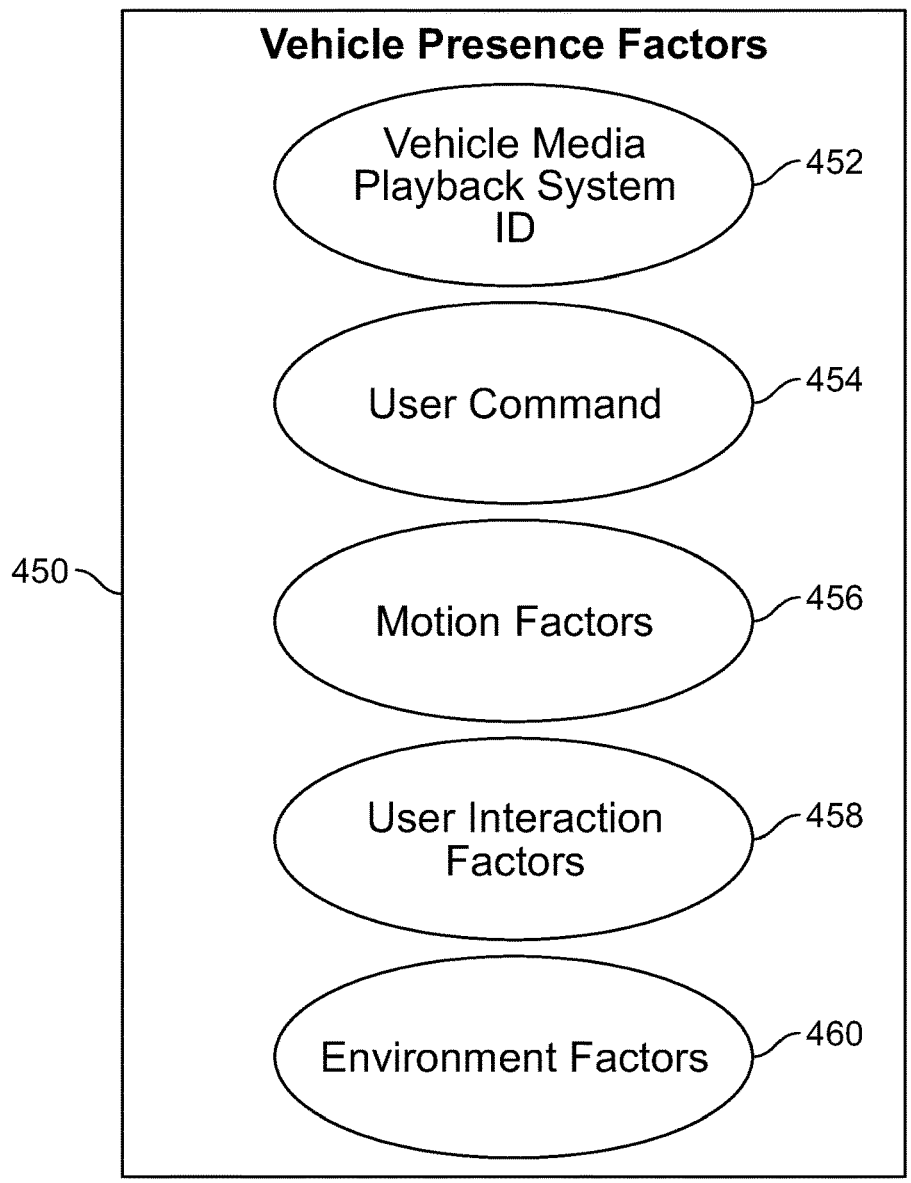
FIG. 10 illustrates an example set of vehicle presence factors.

The method 430 begins with operation 432 in which the media delivery system 104, such as the vehicle presence determination engine 120 thereof, evaluates one or more vehicle presence factors 450 (FIG. 10). The vehicle presence factors 450 include factors used to determine presence of the media-playback device 102 in a vehicle V. As described herein, the vehicle presence factors 450 can be detected and/or generated using the media-playback device 102, such as the vehicle presence factor detection engine 170 and the vehicle presence factor detection device 158 of the media-playback device 102. In other embodiments, the vehicle presence factors can be obtained using the media delivery system 104 based on data received from the media-playback device 102. An example of the evaluation operation 432 is further described with reference to FIG. 10.

At operation 434, the media delivery system 104 operates to determine whether the vehicle presence factors 450 indicate that the media-playback device 102 is in a vehicle. In some embodiments, the media delivery system 104, such as the vehicle presence determination engine 120 thereof, can perform this determination operation. In other embodiments, the media-playback device 102, such as the vehicle presence factor detection engine 170 thereof, can perform this operation, either in cooperation with or independently from the media delivery system 104. An example of the determination operation 434 is further described with reference to FIGS. 13 and 16.

At operation 436, the media delivery system 104, such as the travel mode operation engine 226, initiates the travel mode 402 in the media-playback device 102 upon determining that the vehicle presence factors 450 indicate presence of the media-playback device 102 in a vehicle. In some embodiments, the media delivery system 104 transmits data to the media-playback device 102 to enable the media-playback device 102 to operate in the travel mode 402. If it is not determined that the vehicle presence factors 450 indicate presence of the media-playback device 102 in a vehicle, the media-playback device 102 can remain in the normal mode 400.

FIG. 10 illustrates an example set of vehicle presence factors 450. As described herein, the vehicle presence factors 450 are used to determine presence of the media-playback device 102 in a vehicle V. The vehicle presence factors 450 can be of various types and obtained from various sources. In some embodiments, the vehicle presence factors 450 include a vehicle media-playback system identifier 452, a user command 454, motion factors 456, user interaction factors 458, and environmental factors 460.

The vehicle media-playback system identifier 452 is information that identifies the vehicle media-playback system 264. In some embodiments, the vehicle media-playback system identifiers 452 can have an address for identification to other devices. For example, the address can be used as the identifier 452 to identify and connect the vehicle media-playback system 264 to the media-playback device 102. Because the address is unique to the vehicle media-playback system 264, the media-playback device 102 and/or the media delivery system 104 can determine that the media-playback device 102 is located in a vehicle V having the vehicle media-playback system 264, when the media-playback device 102 is connected to the vehicle media-playback system 264 and receives the address from the vehicle media-playback system 264.

In other embodiments, the vehicle media-playback system identifier 452 can be a device name assigned to the vehicle media-playback system 264. Some embodiments of the vehicle media-playback system 264 can have user-friendly names, which can be presented to a user via a display device to help the user identify which device it is. The device name can be assigned either during manufacturing or by a user. In some embodiments, the device name can be modified by the user. Similarly to the address described above, the device name can be used as the vehicle media-playback system identifier 452 to determine presence of the media-playback device 102 in a vehicle.

In yet other embodiments, other information associated with the vehicle media-playback system 264 can be similarly used as the vehicle media-playback system identifier 452.

The user command 454 includes a command provided by a user which indicates the media-playback device 102 is placed in a vehicle. In some embodiments, the media-playback device 102 can ask a user whether the user, or the media-playback device 102 operated by the user, is in a vehicle. For example, when the media-playback device 102 is turned on, or when a media-playback application is first launched in the media-playback device 102, the media-playback device 102 can provide a user interface that prompts a user to provide information on the location of the user or the media-playback device 102. If the user confirms that the user or the media-playback device 102 is in a vehicle, the media-playback device 102 can be simply determined to be located in a vehicle.

The motion factors 456 include factors or information associated with the motion of the user or the media-playback device 102. Examples of the motion factors 456 include orientation, movement, acceleration, speed, attitude, rotation rates, vibration, and other motion-related measurements of the media-playback device 102. For example, one or more of the motion factors 456 can be used to determine that the media-playback device 102 moves and stops repeatedly and suggest that the media-playback device 102 is placed in a bus stopping at bus stops. In another example, one or more of the motion factors 456 can be used to detect that the media-playback device 102 passes through different Wi-Fi networks or cell towers and suggest that the media-playback device 102 is in a vehicle.

In some embodiments, an application program interface (API) for motion can be used to obtain data using the media-playback device 102, such as the vehicle presence factor detection device 158 thereof, and process the data to produce the motion factors 456 of the vehicle presence factors 450. The vehicle presence factor detection device 158, which is used to obtain motion-related data, is described in detail with reference to FIG. 12.

The user interaction factors 458 include factors or information associated with user interaction with the media-playback device 102. Examples of the user interaction factors 458 include information about a history or pattern of using a particular software program, such as a navigation application (e.g., Google Maps, Bing Maps, or Apple Maps), an online transportation network application (e.g., Uber, Lyft, Hailo, or Sidecar), and a public transit application; a time history or pattern of launching the software program; a period of time (duration) during which the software program is used; information on whether a user input lacks for a predetermined period of time; a history or pattern of searching, browsing, or playing back media content items or playlists thereof; a history of a user's social network activity; information about a user's calendar; and any other information involving user interaction with the media-playback device 102. By way of example, when it is detected that a navigation application is launched and used, the media-playback device 102 may be considered to be in a vehicle.

The environmental factors 460 include factors or information associated with the surroundings of the user or the media-playback device 102. Examples of the environmental factors 460 include a current time of day, a current location, weather information, temperature, humidity, pressure, and any other information of the surroundings. Further, the environmental factors 460 can include operational characteristics of a vehicle. In some embodiments, the vehicle operational characteristics can be obtained based on a sound signature of a vehicle, such as an engine sound, a vehicle horn sound, interior and exterior fan sounds, door opening and closing sounds, a gear shift sound, and any other mechanical or electrical sound attributes of a vehicle. In other embodiments, the vehicle operational characteristics can also be obtained based on a movement signature of a vehicle, such as a vehicle vibration at idling, an up/down movement while driving, and tilting while turned. Moreover, the environmental factors 460 can include other sound characteristics, such as voice characteristics of a driver or passenger in a vehicle cable (i.e., a small, closed space).

Figure 11:
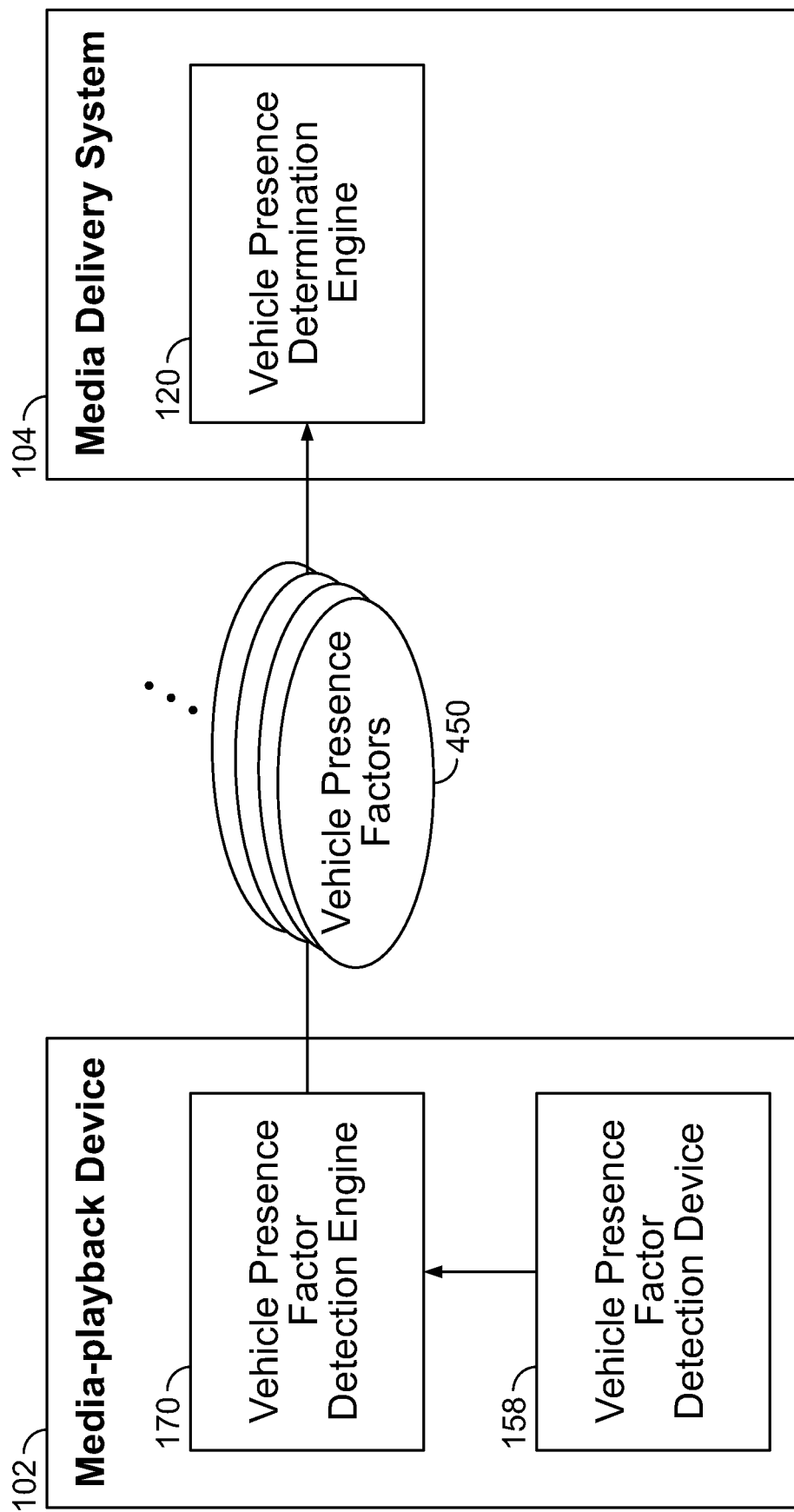
FIG. 11 illustrates the vehicle presence factors being obtained and used by the media-playback device and the media delivery system.

FIG. 11 illustrates the vehicle presence factors 450 being obtained and used by the media-playback device 102 and the media delivery system. In the illustrated example, the vehicle presence factor detection engine 170 can generate the vehicle presence factors 450 based on data obtained using the vehicle presence factor detection device 158. In some embodiments, the vehicle presence factor detection device 158 measures parameters and sends raw data to the vehicle presence factor detection engine 170, and the vehicle presence factor detection engine 170 processes the data and generates the vehicle presence factors 450, which is then transmitted to the vehicle presence determination engine 120. The vehicle presence determination engine 120 can perform the method 430 as described in FIG. 9.

FIG. 12 illustrates an example of the vehicle presence factor detection device 158. In some embodiments, the vehicle presence factor detection device 158 includes one or more position and movement sensors 470, one or more optical sensors 472, one or more acoustical sensors 474, a thermometer 476, and a user input detection device 478.

The position and movement sensors 470 are configured to detect movement and position of the media-playback device 102. In some embodiments, the position and movement sensors 470 further determines an orientation of the media-playback device 102. As an example, the position and movement sensors 470 may determine an orientation of the media-playback device 102 with respect to a primary direction of gravitational acceleration. The position and movement sensors 470 may detect changes in the determined orientation and interpret those changes as indicating movement of the media-playback device 102. In some embodiments, the position and movement sensors 470 include one or more accelerometers, gyroscopes, magnetometers, GPS receivers, altimeters, odometers, speedometers, shock detectors, vibration sensors, and proximity sensors.

The optical sensors 472 are configured to detect optical signals proximate the media-playback device 102. In some embodiments, the optical sensors 472 include one or more light sensors, cameras, and infrared sensors. For example, the optical sensors 472 may capture images or videos. The captured images can be processed to detect gestures, which may then be interpreted as motions or movements that can occur in a vehicle cabin, such as maneuvering the wheel. Similarly, a light sensor can be used to determine various properties of the environment proximate the user computing device, such as the brightness and primary frequency (or color or warmth) of the light in the environment proximate the media-playback device 102. These properties of the sensed light may then be used to infer whether the media-playback device 102 is in an indoor environment (such as in a vehicle), an outdoor environment, a private vehicle, public transit, etc.

The acoustical sensors 474 are configured to detect sounds proximate the media-playback device 102. In some embodiments, the acoustical sensors 474 include one or more microphones. For example, the acoustical sensors 474 may capture a recording of sounds from proximate the media-playback device 102. These recordings may be analyzed using speech recognition technology to identify words spoken by the user. The words may be recognized as commands from the user that alter the behavior of the media-playback device and the playback of media content. The words and/or recordings may also be analyzed using natural language processing and/or intent recognition technology to determine appropriate actions to take based on the spoken words. Additionally or alternatively, the acoustical sensors 474 may determine various sound properties about the sounds proximate the user such as volume, dominant frequency or frequencies, etc. These sound properties may be used to make inferences about the environment proximate to the media-playback device 102 such as whether the sensed sounds are likely to correspond to sound characteristics in an indoor environment (such as in a vehicle), an outdoor environment, a private vehicle, public transportation, etc.

Figure 13:
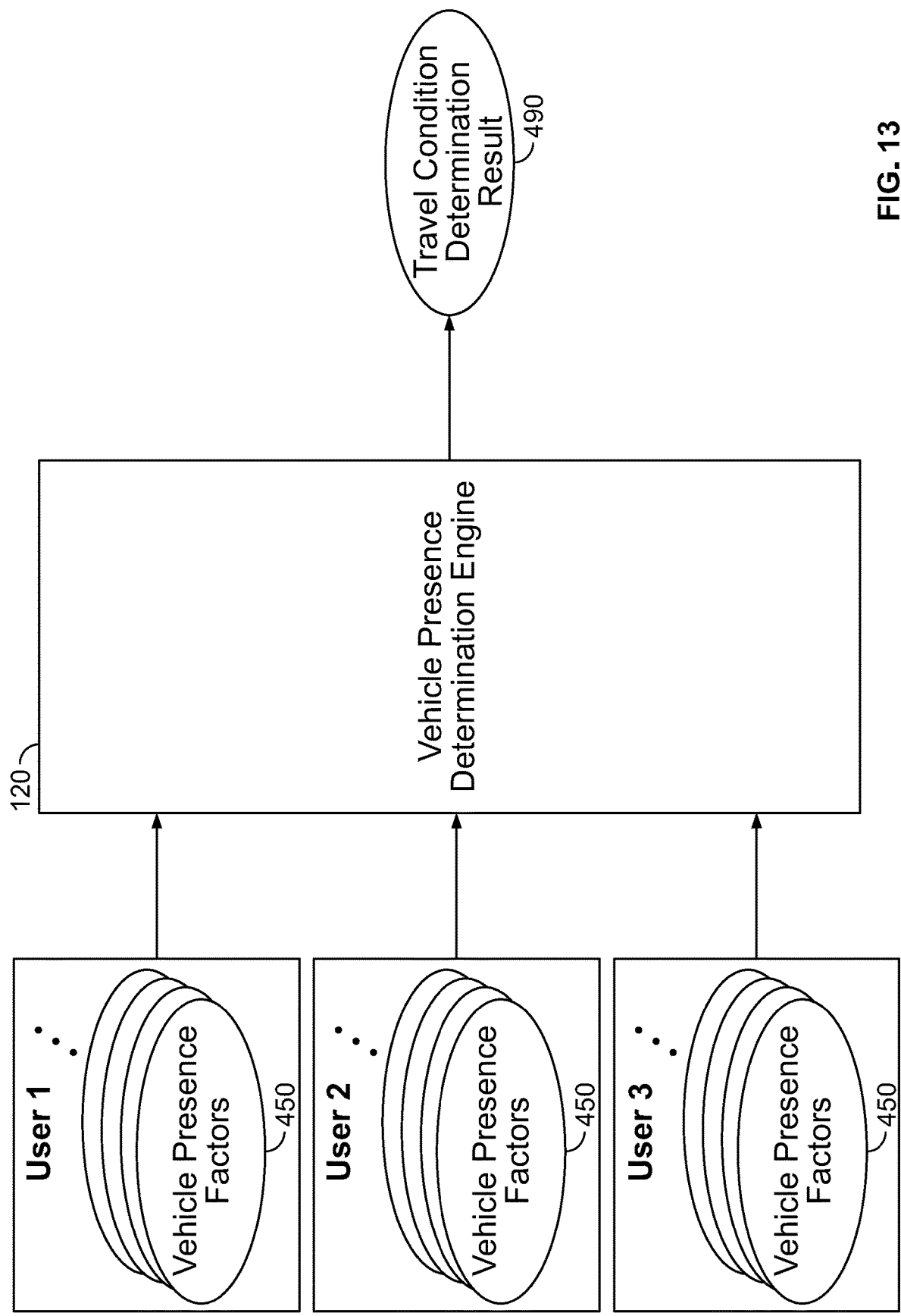
FIG. 13 illustrates an example operation of a vehicle presence determination engine.

FIG. 13 illustrates an example operation of the vehicle presence determination engine 120. As described herein, the vehicle presence determination engine 120 receives and evaluates one or more vehicle presence factors 450 and then generates a travel condition determination result 490 based on the vehicle presence factors 450.

In some embodiments, the vehicle presence factors 450 can be respectively used as an input to the vehicle presence determination engine 120. In other embodiments, a combination of one or more of the vehicle presence factors 450 can be used as an input to the vehicle presence determination engine 120.

In some embodiments, the vehicle presence factors 450 can be obtained from a single, current user of a particular media-playback device 102. In other embodiments, the vehicle presence factors 450 can be obtained from a plurality of users (such as User 1, User 2, and User 3, for example) who use different media-playback devices 102 respectively. When the vehicle presence factors 450 are generated based on observations of a plurality of users, the current user of a particular media-playback device 102 can be included in the plurality of users in some embodiments, or excluded from the plurality of users in other embodiments.

In some embodiments, the travel condition determination result 490 includes information about a mode (either the normal mode 400 or the travel mode 402) and/or a vehicle presence state in the travel mode (e.g., self-driving state, bus-riding state, commute state, biking state, etc.). For example, the travel condition determination result 490 includes a determination result of whether the media-playback device 102 (and thus a user thereof) is in a vehicle. In other embodiments, the travel condition determination result 490 further includes determination result of whether the media-playback device 102 (and thus a user thereof) is in a vehicle (e.g., a personal vehicle or a public vehicle of transportation) at a particular time of day (e.g., in the morning or evening) and/or on a particular situation (e.g., on a daily commute).

Figure 14:
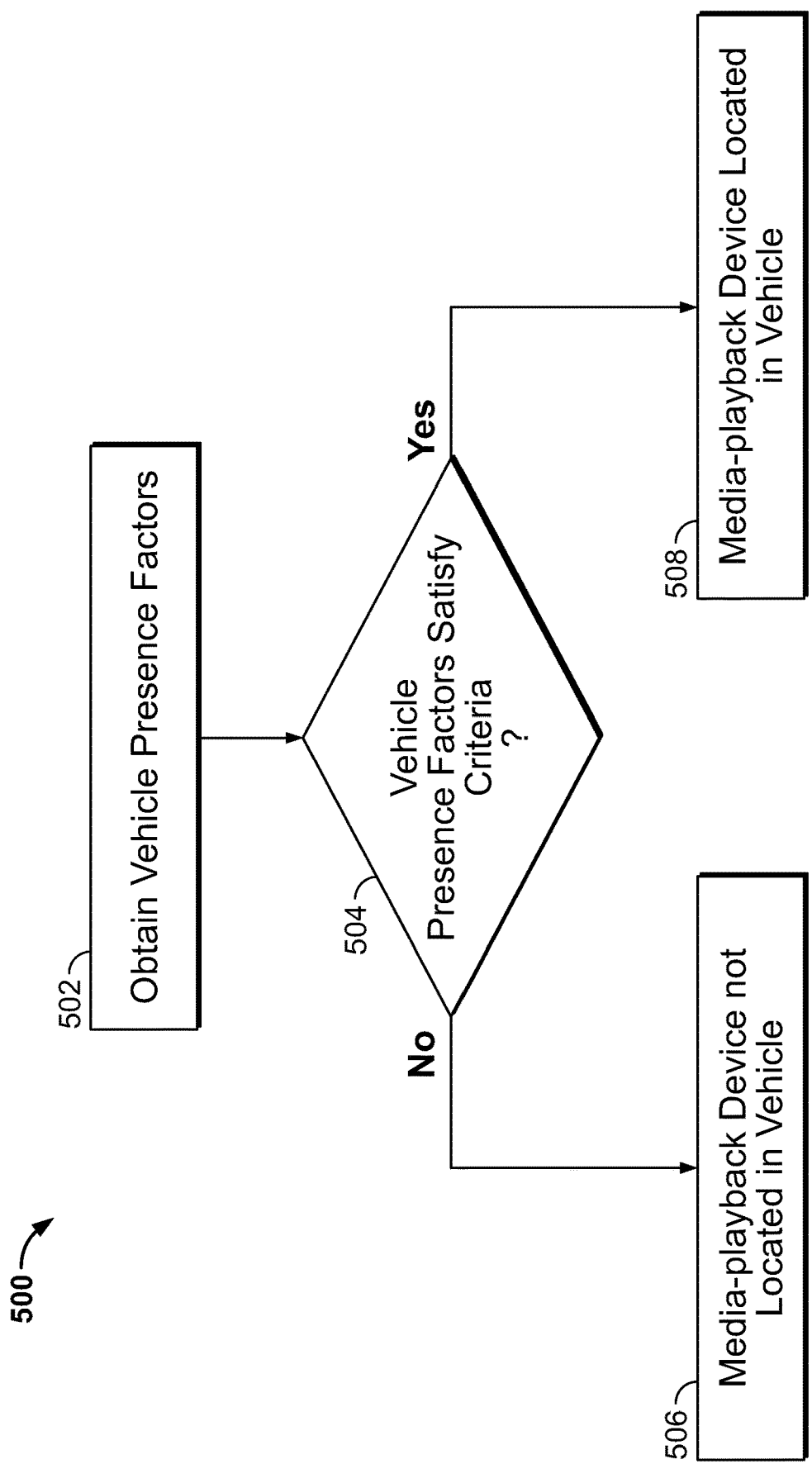
FIG. 14 is a flowchart of an example method of operating the vehicle presence determination engine of FIG. 13.

FIG. 14 is a flowchart of an example method 500 of operating the vehicle presence determination engine 120. In this example, the vehicle presence determination engine 120 determines vehicle presence based on one or more criteria, such as thresholds.

The method 500 can begin at operation 502 in which the vehicle presence determination engine 120 obtains one or more vehicle presence factors 450. Then, at operation 504, the vehicle presence determination engine 120 determines whether the vehicle presence factors 450 satisfy one or more criteria (or a set of criteria). If it is determined that the vehicle presence factors 450 do not meet the criteria ("NO" at the operation 504), the media-playback device 102 is not considered to be located in a vehicle, as in operation 506. If it is determined that the vehicle presence factors 450 meet the criteria ("YES" at the operation 504), the media-playback device 102 is considered to be located in a vehicle, as in operation 508.

Figure 15:
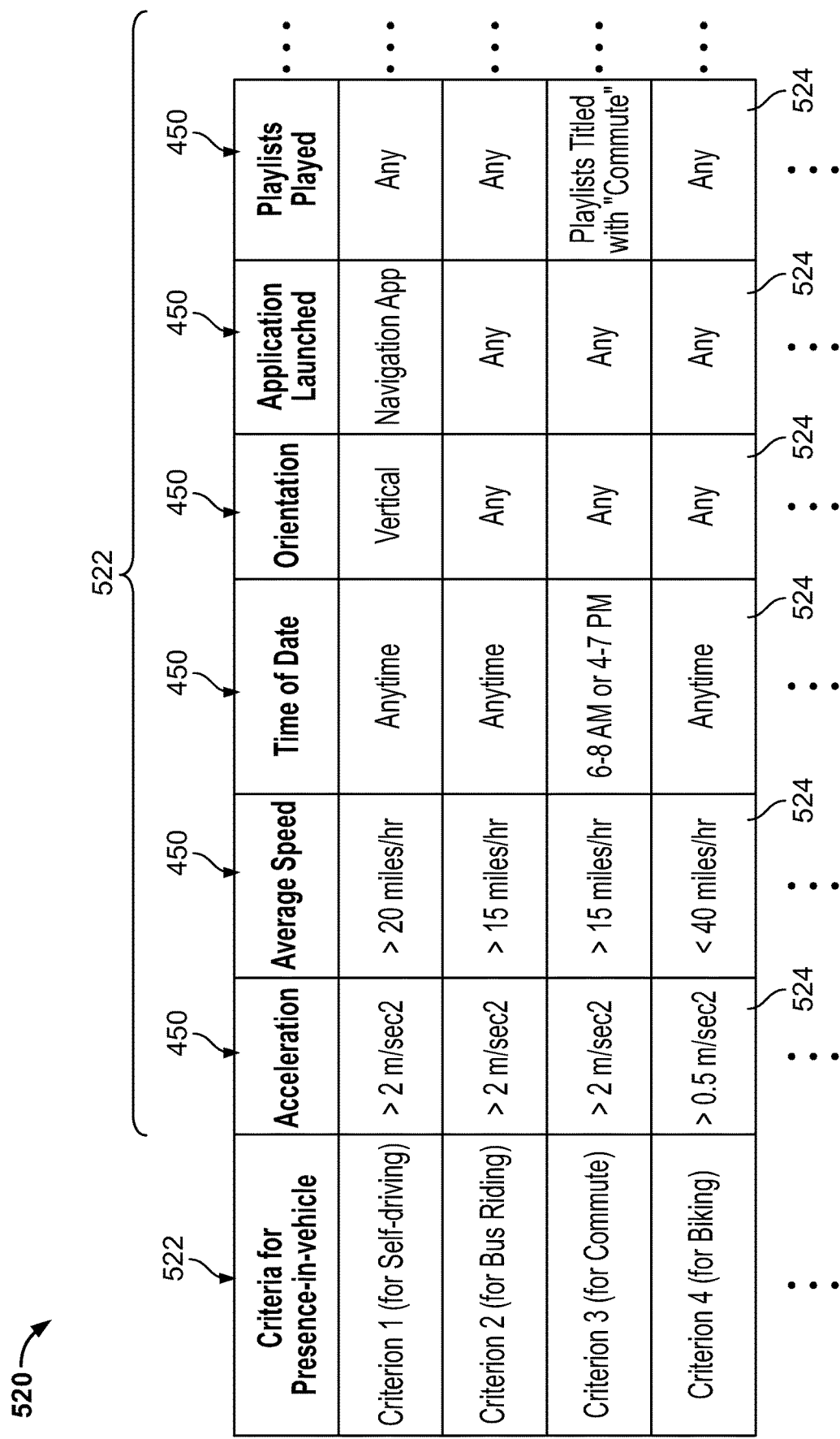
FIG. 15 is an example table that illustrates various criteria for different vehicle presence situations.

FIG. 15 is an example table 520 that illustrates various criteria for different vehicle presence situations. In this example, in the table 520, the first column 522 shows different criteria for different vehicle presence states. By way of example, Criterion 1 is set up for a self-driving situation, Criterion 2 is configured for a bus riding, Criterion 3 is for commute, and Criterion 4 is made for biking. In each vehicle presence state, the corresponding criteria include one or more thresholds 524 for one or more vehicle presence factors 450 associated with criteria. The columns 522 show the vehicle presence factors 450 and the associated thresholds 524 for the corresponding criteria in the first column 522.

Figure 16:
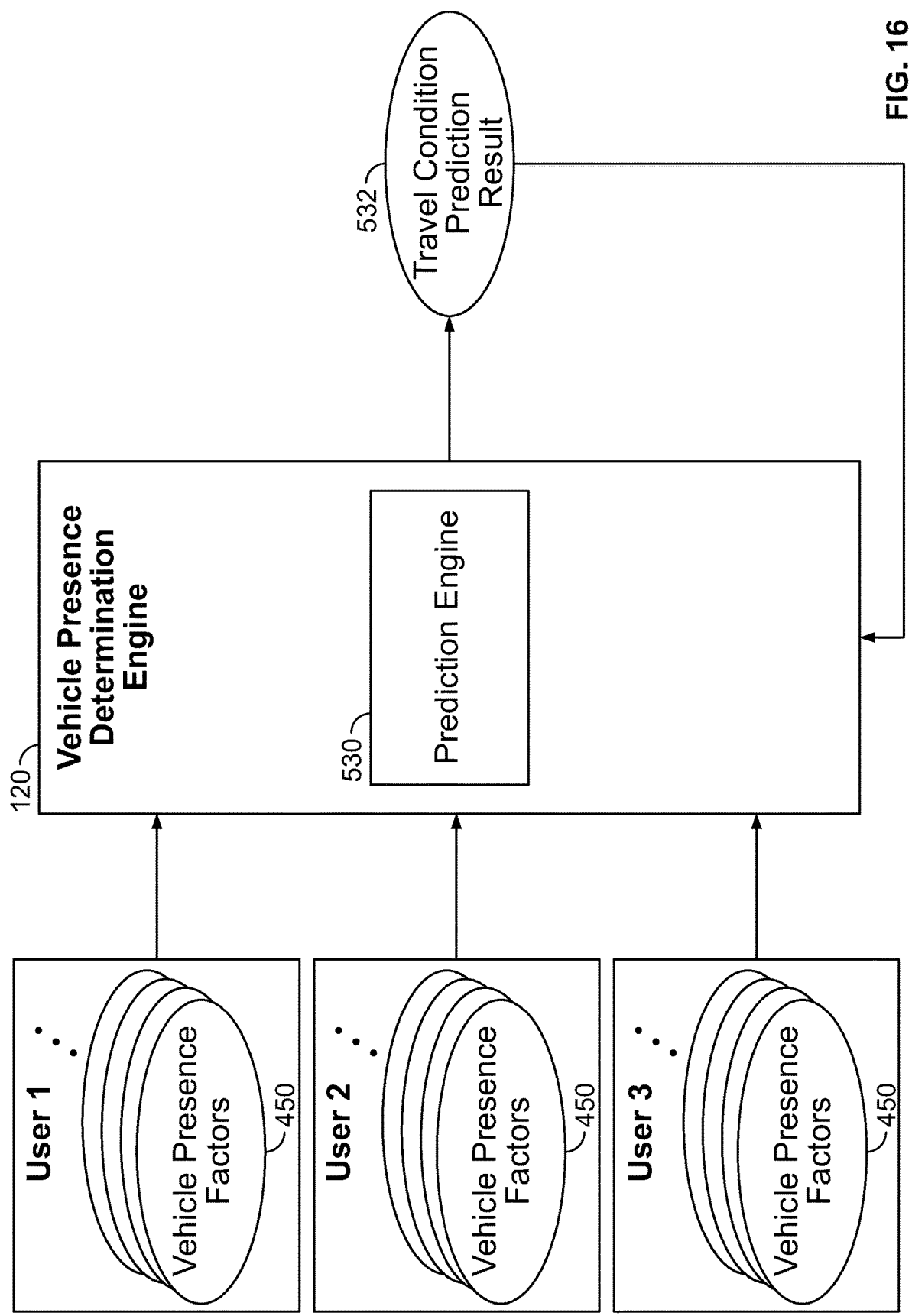
FIG. 16 is a block diagram illustrating another example operation of the vehicle presence determination engine of FIG. 13.

FIG. 16 is a block diagram illustrating another example operation of the vehicle presence determination engine 120. In this example, the vehicle presence determination engine 120 includes a prediction engine 530 for predicting whether the media-playback device 102 is in a vehicle. Similarly to FIG. 13, the vehicle presence determination engine 120 receives and evaluates one or more vehicle presence factors 450 and then generates a travel condition prediction result 532 based on the vehicle presence factors 450.

In some embodiments, the travel condition prediction result 532 includes information about a mode (either the normal mode 400 or the travel mode 402) and/or a vehicle presence state in the travel mode (e.g., self-driving state, bus-riding state, commute state, biking state, etc.). For example, the travel condition prediction result 532 includes a prediction result of whether the media-playback device 102 (and thus a user thereof) is in a vehicle. In other embodiments, the travel condition prediction result 532 further includes prediction result of whether the media-playback device 102 (and thus a user thereof) is in a vehicle (e.g., a personal vehicle or a public vehicle of transportation) at a particular time of day (e.g., in the morning or evening) and/or on a particular situation (e.g., on a daily commute).

The prediction engine 530 can operate in various ways. In an example, the prediction engine 530 can have a list of pre-generated modes (e.g., the normal mode and the travel mode) and/or states (e.g., self-driving state, bus-riding state, commute state, biking state, etc.), assign a likelihood value to each state based on the input of vehicle presence factors 450, and then produce a result set of the different modes and/or states and their likelihood. These pre-generated modes and/or states may have respective, default metadata. The default metadata may be based on observations of the current user, other users, or combinations thereof. In another example, the prediction engine 530 may make predictions regarding specific metadata and then package them together into a mode and/or state or select a mode and/or state based on the predicted metadata.

In some embodiments, the travel condition prediction result 532 includes various pieces of information that can be used to perform the travel mode 402. For example, the travel condition prediction result 532 can include information about whether the media-playback device 102 would be placed in a vehicle; which mode (either the normal mode 400 or the travel mode 402) would be performed; a which media content items or playlists the user would be interested in playing, which media content items or playlists the user would not be interested in playing, a duration of travel; a location of travel, weather data during travel; a user activity in the travel; media content items that other users would play during the same or similar travel; media content items that other users would not play during the same or similar travel; a predicted mood of the user while in the travel; a predicted energy level of the user during the travel; and any other travel related information, such as a travel destination, a travel route, traffic along a travel route, a travel transportation type (e.g., public transit, personal vehicle, shared vehicle, etc.), a travel cost, a travel transportation make, and a travel transportation model.

In some embodiments, the prediction engine 530 is designed using one or more machine learning techniques. The prediction engine 530 can be built using training samples. The training samples can include the different travel conditions (e.g., modes and states) and the input data (e.g., the vehicle presence factors) that have positive or negative correlations with respective conditions. The training samples can be based on data gathered from the current user and/or other users, such as other users sharing one or more demographic similarities with the user (e.g., location, age, music preferences, etc.). Training examples can also be based on data received directly from the user. For example, the prediction engine 530 can ask the user questions, such an inquiry regarding the address of the user's workplace. The responses to those questions can be used as training data. For example, travel towards the workplace address can positively correlate with a current state being a commute state in a travel mode and a future state being a normal mode.

The prediction engine 530 may, for example, operate to determine how similar or dissimilar given input data of vehicle presence factors is to particular training examples for particular conditions (modes and states). Once generated, the models may be stored in memory device 156, memory device 190, or in another location, for later use to evaluate media content items.

Once trained, the prediction engine 530 operates to predict a travel condition, such as various vehicle presence states in a travel mode 402, using input data of vehicle presence factors 450. The input of vehicle presence factors 450 is run through the prediction engine 530 to product one or more predictions. The one or more predictions can have a respective score expressing a confidence in the prediction being correct, such as a value expressing how similar the input data is to a particular training example.

The prediction engine 530 can further predict media content items or playlists that the user may want to play in determined or predicted mode (either the normal mode or the travel mode) and/or vehicle presence state (as in column 522 in FIG. 15). In this configuration, the prediction engine 530 can further receive input data that may affect the selection of media content items, such as attributes of the current user, attributes of other users, the current state, the predicted future state, and other data. The input data may be fed into the prediction engine 530 that can also receive a group of media content items available to be played (e.g., media content items available to the user on the media server 180). Based on these inputs, the prediction engine 530 can output selected media content items.

One or more techniques for building models and training described in U.S. Patent Application No. 62/347,642, filed Jun. 9, 2016 and titled Identifying Media Content, the disclosure of which is incorporated by reference herein in its entirety, can be similarly used by system 100 disclosed herein for building models for predicting device states.

Figure 17:
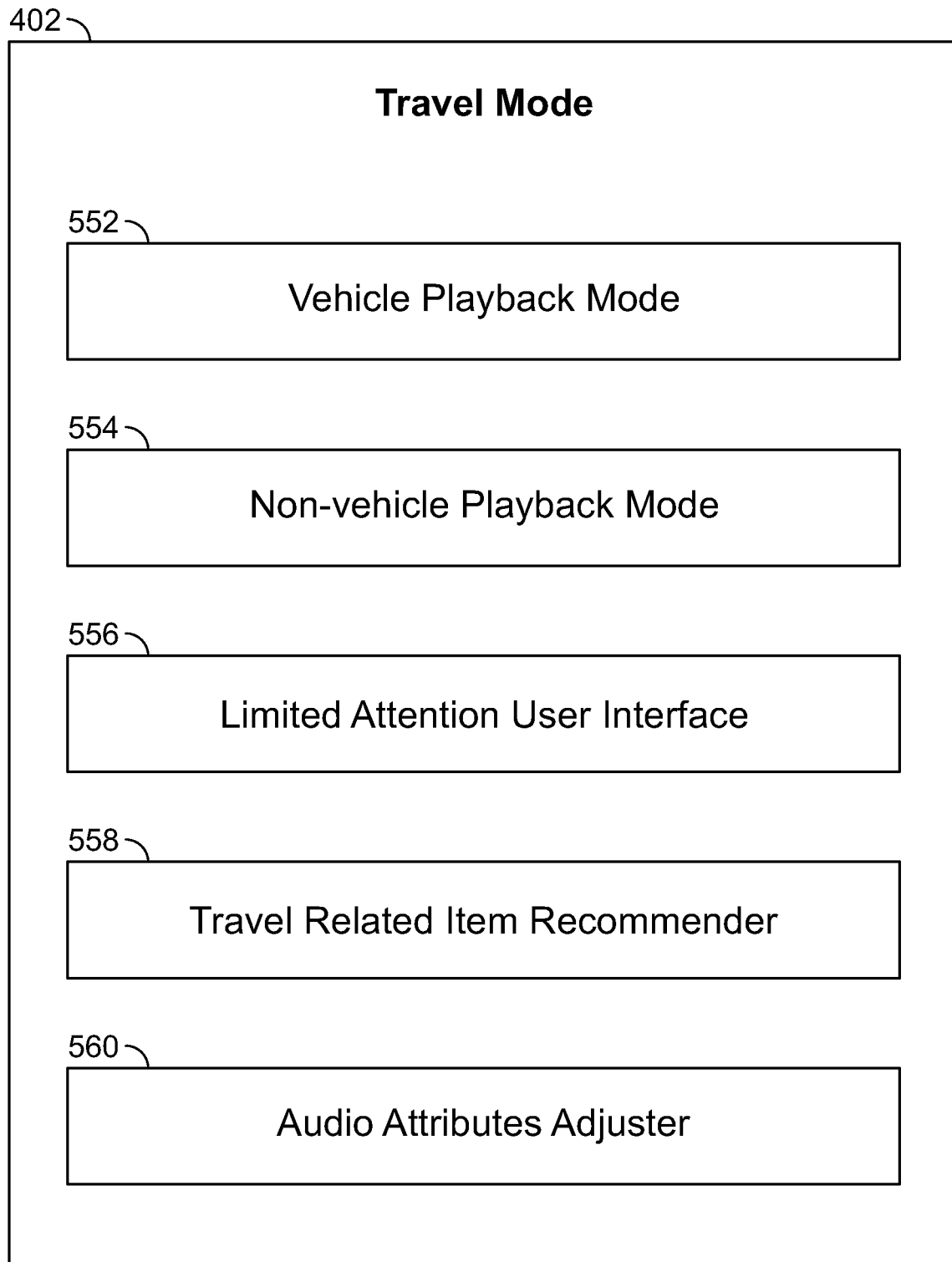
FIG. 17 illustrates example functionalities provided in the travel mode.

FIG. 17 illustrates example functionalities provided in the travel mode 402. In some embodiments, the travel mode 402 provides a vehicle playback mode 552, a non-vehicle playback mode 554, a limited attention user interface 556, a travel related media content item recommender 558, and an audio attributes adjuster 560. It is understood however that other functionalities can also be provided in the travel mode 402 in other embodiments.

The vehicle playback mode 552 provides a playback mode suited for playing back media content items in a vehicle during the travel mode.

The non-vehicle playback mode 554 provides a playback mode desirable for playing back media content items when the user of the media-playback device 102 is moving but not in a vehicle, such as running.

The limited attention user interface 556 provides interfaces that require less attention from the user and/or are less distracting than a standard interface in the normal mode 400. Examples of the limited attention user interface 556 include bigger UI buttons, simpler interaction, voiceovers to understand what the user is listening to and voice control. The limited-attention interfaces can be useful during travelling because a user may have limited attention available for interacting with a media-playback device due to the need to concentrate on travel related activities, including for example driving and navigating. But the limited-attention interface can also be configured for use playing back media-content during other activities that require the user's concentration, such as exercising, playing games, operating heavy equipment, reading, studying, etc.

The travel related media content item recommender 558 provides media content items or playlists thereof that the user would be interested in playing when the media-playback device 102 is in the travel mode 402.

The audio attributes adjuster 560 operates to adjust the attributes of media content item output between the normal mode 400 and the travel mode 402, or between different vehicle presence states in the travel mode 402.

As noted previously, although many of the examples provided above are described with respect to traveling in a vehicle, other embodiments relate to other forms of travel or even other types of activities in which a user should not be distracted.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method for automatically initiating a travel mode of a media-playback device, the method comprising:
    evaluating at least one vehicle presence factor;
    determining that the at least one vehicle presence factor indicates that the media-playback device is in a vehicle;
    initiating a travel mode for media content playback using the media-playback device, the media content selected from one or more playlists;
    using one or more thresholds of the at least one vehicle presence factor for determining a vehicle presence state within the travel mode and assigning a likelihood value to the vehicle presence state based on a similarity to pre-generated vehicle presence states; and
    generating on the media-playback device a limited-attention media playback user interface based on the determined vehicle presence state within the travel mode, the limited-attention media playback user interface being configured to control the media content playback while the media-playback device remains in the determined vehicle presence state.

2. The method of claim 1, wherein the at least one vehicle presence factor is associated with the media-playback device.

3. The method of claim 1, wherein the at least one vehicle presence factor includes at least one of motion factor, user interaction factor, and environmental factor.

4. The method of claim 1, further comprising:
prior to evaluating at least one vehicle presence factor, detecting the at least one vehicle presence factor using the media-playback device.

5. The method of claim 4, wherein detecting includes:
detecting a motion of the media-playback device using the media-playback device; and
associating the motion of the media-playback device with one or more of the at least one vehicle presence factor.

6. The method of claim 4, wherein the motion of the media-playback device includes at least one of an arrangement, movement, acceleration, vibration, and orientation of the media-playback device.

7. The method of claim 4, wherein detecting includes:
detecting a user interaction with the media-playback device using the media-playback device; and
associating the user interaction with one or more of the at least one vehicle presence factor.

8. The method of claim 7, wherein the user interaction includes at least one of a pattern of using the media-playback device, a pattern of playing media content items, and a pattern of using one or more software applications in the media-playback device.

9. The method of claim 4, wherein detecting includes:
detecting environmental factors around the media-playback device using the media-playback device; and
associating the environmental factors with one or more of the at least one vehicle presence factor.

10. The method of claim 9, wherein the environment factors include at least one of sound, image, and temperature around the media-playback device.

11. A media delivery system comprising:
a processing device; and
at least one non-transitory computer readable data storage device storing instructions that, when executed by the processing device, cause the media delivery system to:
evaluate at least one vehicle presence factor;
determine that the at least one vehicle presence factor indicates that a media-playback device is in a vehicle;
initiate a travel mode for media content playback using the media-playback device, the media content selected from one or more playlists;
use one or more thresholds of the at least one vehicle presence factor to determine a vehicle presence state within the travel mode and assign a likelihood value to the vehicle presence state based on a similarity to pre-generated vehicle presence states; and
generate a limited-attention media playback user interface on the media-playback device based on the determined vehicle presence state within the travel mode, the limited-attention media playback user interface being configured to control the media content playback while the media-playback device remains in the determined vehicle presence state.

12. The system of claim 11, wherein the instructions further cause the media delivery device to:
prior to evaluating at least one vehicle presence factor, receive the at least one vehicle presence factor from the media-playback device, the at least one vehicle presence factor obtained using the media-playback device.

13. The system of claim 11, wherein the at least one vehicle presence factor includes at least one of motion factor, user interaction factor, and environmental factor.

14. The system of claim 13, wherein the motion factor includes at least one of an arrangement, movement, acceleration, vibration, and orientation of the media-playback device.

15. The system of claim 13, wherein the user interaction factor includes at least one of a pattern of using the media-playback device, a pattern of playing media content items, and a pattern of using one or more software applications in the media-playback device.

16. The system of claim 13, wherein the environment factor includes at least one of sound, image, and temperature around the media-playback device.

17. A non-transitory computer readable storage device storing data instructions, which when executed by a processing device, cause the processing device to:
detect at least one vehicle presence factor;
determine that the at least one vehicle presence factor indicates that a media-playback device is in a vehicle;
operate the media-playback device in a travel mode;
determine a vehicle presence state within the travel mode using one or more thresholds of the at least one vehicle presence factor and assign a likelihood value to the vehicle presence state based on a similarity to pre-generated vehicle presence states; and
generate a limited-attention media playback user interface on the media-playback device based on the determined vehicle presence state within the travel mode, the limited-attention media playback user interface being configured to control media content playback while the media-playback device remains in the determined vehicle presence state, the media content selected from one or more playlists.

18. The computer readable storage device of claim 17, wherein the data instructions further cause the processing device to:
detect a motion of the media-playback device using a vehicle presence detection device; and
associate the motion of the media-playback device with one or more of the at least one vehicle presence factor.

19. The computer readable storage device of claim 17, wherein the data instructions further cause the processing device to:
detect a user interaction with the media-playback device using a vehicle presence detection device; and
associate the user interaction with one or more of the at least one vehicle presence factor.

20. The computer readable storage device of claim 17, wherein the data instructions further cause the processing device to:
detect environmental factors around the media-playback device using a vehicle presence detection device; and
associate the environmental factors with one or more of the at least one vehicle presence factor.

21. The method of claim 1, further comprising outputting selected media content items based on the vehicle presence state within the travel mode.

22. The method of claim 1, further comprising adjusting attributes of media content item output between a normal mode and the travel mode, and between different vehicle presence states within the travel mode.

23. The method of claim 1, wherein the limited-attention media playback user interface is different from a user interface in a non-travel mode and includes at least one of a different size of UI elements and a voiceover control.

24. The method of claim 1, wherein the one or more thresholds are based on one or more operational characteristics of the media-playback device.

25. The method of claim 24, wherein the one or more operational characteristics are selected from an orientation, an application launched, and a playlist being played on the media-playback device.

26. The method of claim 1, wherein the pre-generated vehicle presence states are determined by using training samples that include vehicle presence factors having positive or negative correlations with respective vehicle presence states.

27. The method of claim 1, wherein the pre-generated vehicle presence states are determined by machine learning that uses data from users sharing one or more demographic similarities with a current user of the media-playback device.

* * * * *